United States Patent
Wuerth et al.

[11] Patent Number: 6,149,251
[45] Date of Patent: Nov. 21, 2000

[54] PROCESS AND DEVICE FOR CONTROLLING A BRAKING FORCE OF AT LEAST ONE WHEEL OF A VEHICLE

[75] Inventors: Gebhard Wuerth, Sulzbach-Laufen; Elmar Mueller, Markgröningen; Frank Leibeling, Möglingen; Dieter Schuetz, Vaihingen, all of Germany

[73] Assignee: Robert Bosch GmbH, Stuttgart, Germany

[21] Appl. No.: 08/981,382

[22] PCT Filed: Apr. 9, 1997

[86] PCT No.: PCT/DE97/00711

§ 371 Date: Mar. 4, 1998

§ 102(e) Date: Mar. 4, 1998

[30] Foreign Application Priority Data

Apr. 18, 1996 [DE] Germany ............................ 196 15 294

[51] Int. Cl.$^7$ ....................................................... B60T 8/60
[52] U.S. Cl. ..................... 303/146; 303/140; 303/147; 701/70
[58] Field of Search .................... 303/146, 147, 303/140; 701/70

[56] References Cited

U.S. PATENT DOCUMENTS 5,482,133 1/1996 Iwata et al. ............................ 303/140
5,560,690 10/1996 Hattori et al. .......................... 303/146
5,620,239 4/1997 Mihara et al. .......................... 303/121
5,742,919 4/1998 Ashrafi et al. .......................... 303/146

FOREIGN PATENT DOCUMENTS 196 04 126 8/1997 Germany.

*Primary Examiner*—Michael Mar
*Assistant Examiner*—Mariano Sy
*Attorney, Agent, or Firm*—Kenyon & Kenyon

[57] ABSTRACT

A device and a process for controlling the braking force at at least one wheel of a vehicle include at least a first arrangement for determining a criterion which describes and/or influences the vehicle movement, a second arrangement for determining a variable which describes the wheel dynamics of the wheel in question, and a third arrangement with which it is determined, at least as a function of the criterion which was determined, whether a driver-independent brake intervention at a wheel is foreseeable. Furthermore, the device and the process contain a fourth arrangement with which a slight activation of the actuators assigned to the wheel, with variable duration, can be performed if the requirement of a foreseeable driver-independent brake intervention is met, this activation occurring before this driver-independent brake intervention. The duration of the slight activation of the actuators is determined at least as a function of the variables which describe the wheel dynamics of the wheel in question.

17 Claims, 17 Drawing Sheets

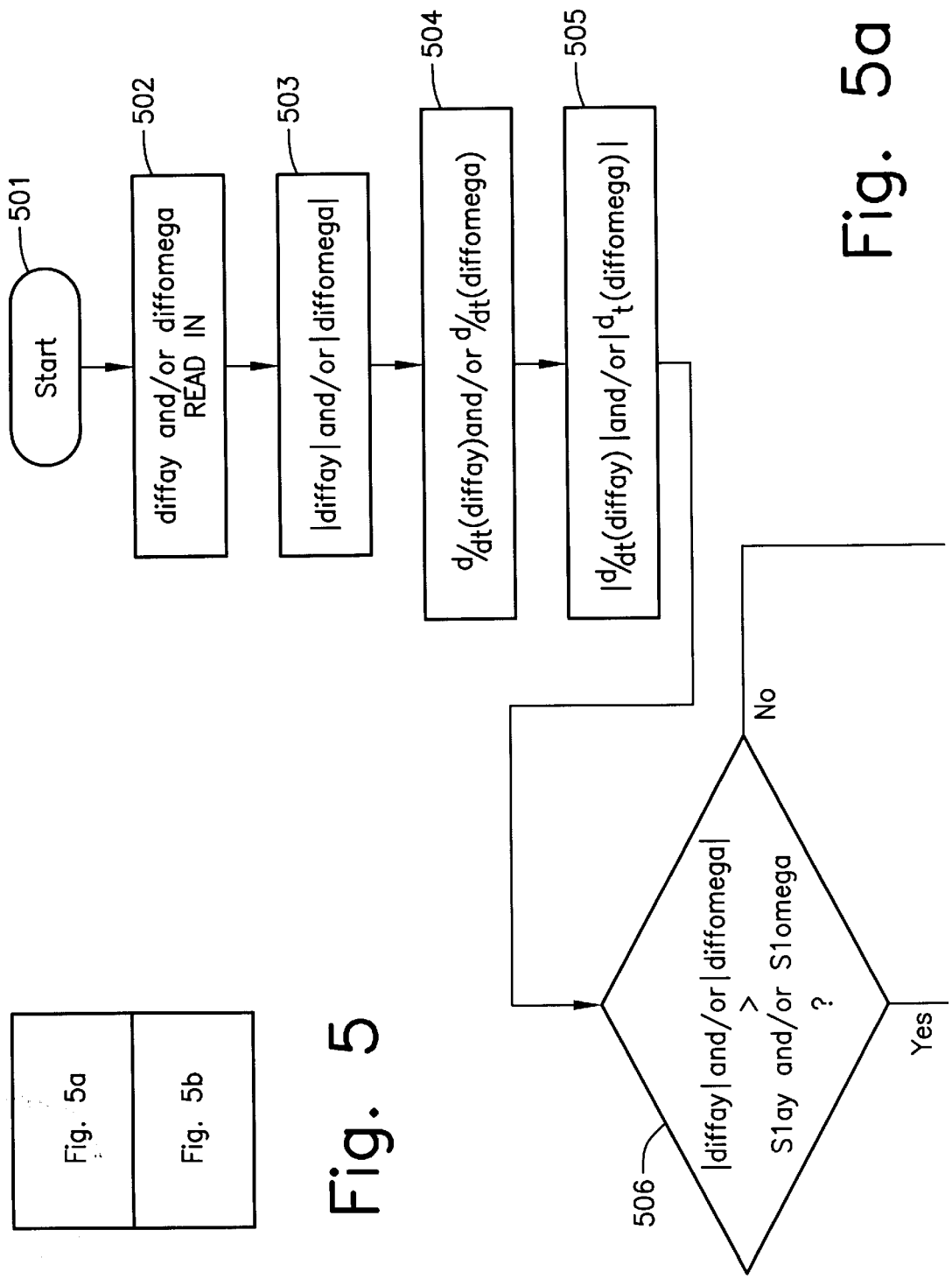

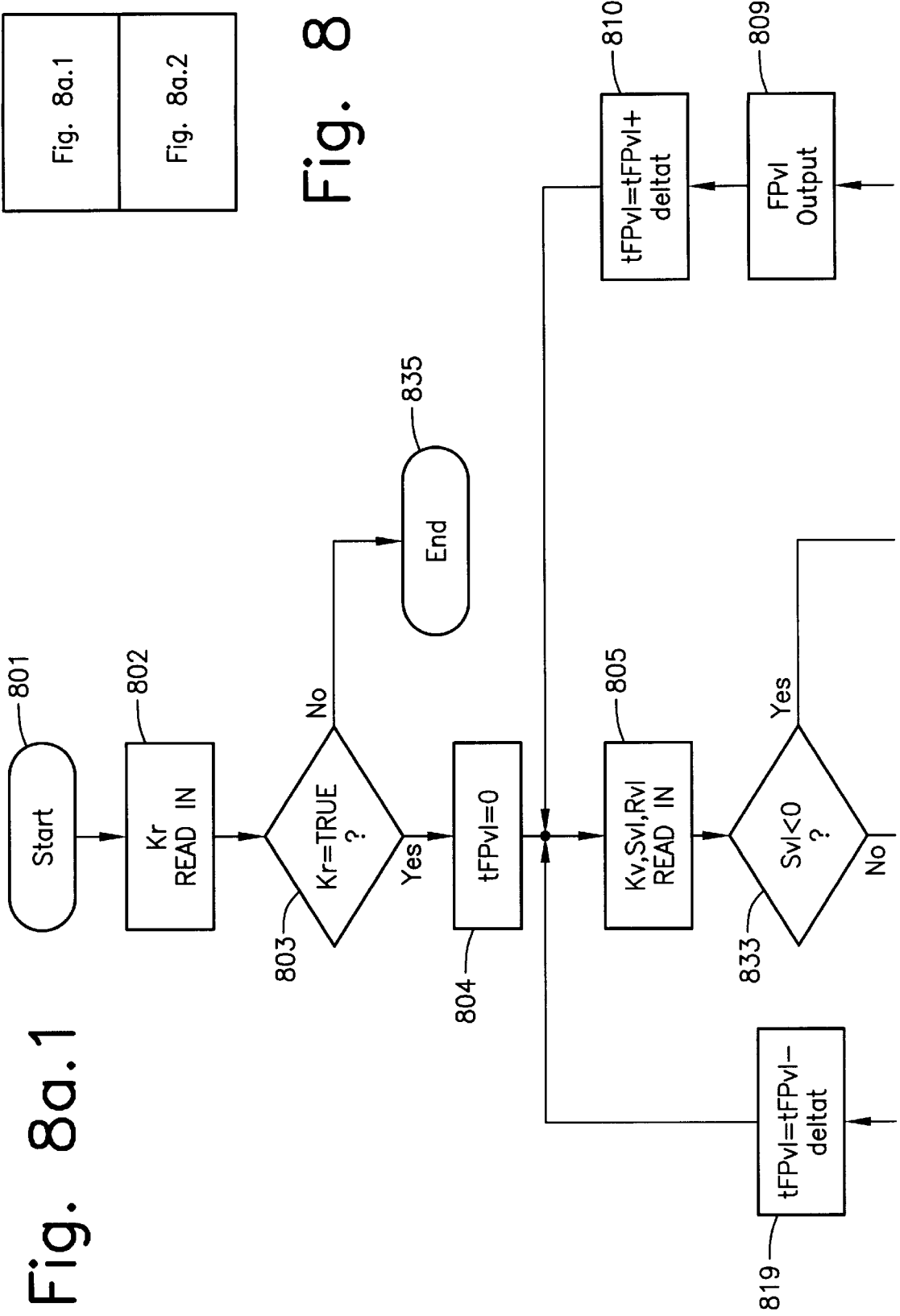

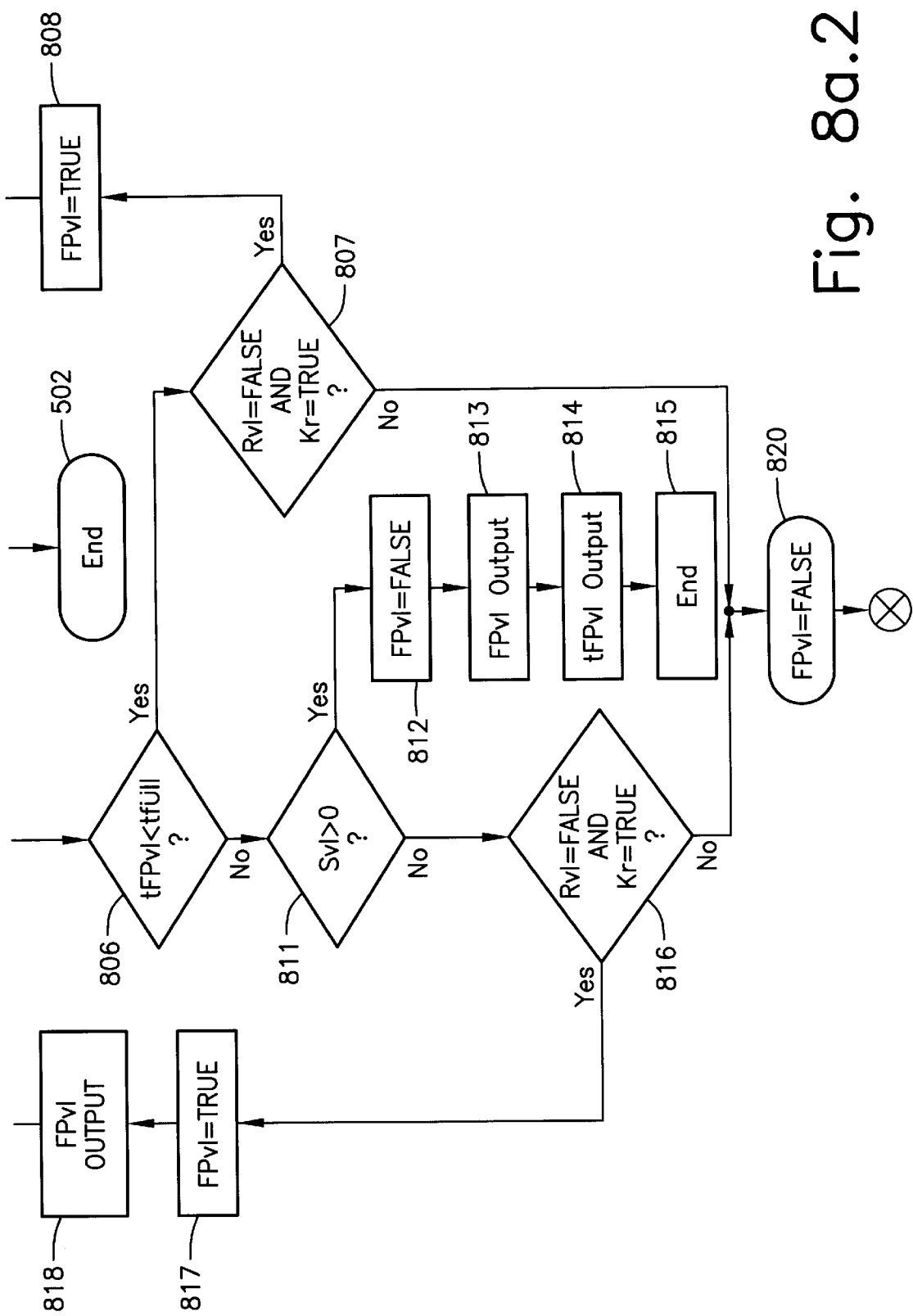
Fig. 8a.2

PROCESS AND DEVICE FOR CONTROLLING A BRAKING FORCE OF AT LEAST ONE WHEEL OF A VEHICLE

FIELD OF THE INVENTION

The present invention relates to a process and device for controlling a braking force of at least one wheel of a vehicle.

BACKGROUND INFORMATION

Processes and devices for controlling the braking force of at least one wheel of a vehicle are known in many variations. In these processes and devices, reference values are generally determined from measured values and estimated values. This essentially involves reference values which describe and/or influence the vehicle movement, such as wheel slip and/or yaw angle velocity. Proceeding from these reference values, braking moments are adjusted at the wheels of the vehicle. In the case of some of these conventional processes and devices, adjustment of the braking moments can take place individually by wheel.

In order to compensate varying dynamic performance (control response) which is caused, for example, by the temperature behavior of the components arranged in the device, or due to hydraulic and/or geometric tolerances, in some of these processes and devices a slight brake pressure is fed in, in the form of a time-limited filling pulse, before the pressure build-up which is necessary for adjusting the required braking moment occurs. As an alternative or supplement to this, in some devices and processes a correction of the valve control times is made.

German Patent Application No. 34 23 063 describes a traction control system for vehicles. in which a wheel is braked if a tendency for this wheel to slip occurs. In order to achieve rapid response of the brake when the tendency for the wheel to slip is detected, the brake is already applied at the very moment of the preliminary stages of the tendency to slip, by adjusting a slight brake pressure. In this connection, supply of the slight brake pressure is triggered as a function of the change in the throttle valve position, as a function of the vehicle speed, or as a function of slip thresholds which lie below the response thresholds for actual traction control. The slight brake pressure is supplied using a filling pulse with a constant time period. This means that when the need to supply the slight brake pressure exists, this pressure is supplied to the appropriate wheel brake cylinder for the predetermined period of time. Because of the low brake pressure supplied before the actual brake intervention, the reaction time which elapses from the time the tendency to slip has been determined until braking begins is reduced.

Since the filling pulse has a fixed, predetermined time period for all the wheels of a vehicle, tolerances which might be different for the individual wheels, for example, are not taken into consideration. This can result in differences in control response at the individual wheels, even though the slight brake pressure is supplied.

German Patent Application No. 196 04 126.0 describes a process and a device for controlling the brake system of a vehicle. In this conventional method and device, a build-up or reduction of the brake pressure in the brake cylinders is implemented by a pulse-like control of the inlet and outlet valves associated with the wheel brake cylinder. For this purpose, a pulse signal is used as the control signal, and this pulse signal can be changed in at least one parameter. Such possible parameters are the pulse length, the pulse pause period, the pulse height and/or the frequency of the pulse signal. In order to guarantee uniform pressure build-up dynamics in all operating situations, the parameter used in each instance is corrected as a function of a value which influences the pressure change dynamics. Appropriate values would be, for example, the temperature of the hydraulic oil or the ambient temperature and/or the supply voltage of the pump motor.

The task of the present invention consists in improving the compensation of varying control response within the device, i.e. within the process for controlling the braking force at at least one wheel of a vehicle.

SUMMARY OF THE INVENTION

The process and device according to the present invention are advantageous over the conventional processes and devices in that the time period during which the actuators assigned to the wheel in question are activated, before a foreseeable driver-independent brake intervention occurs, and during which a slight brake pressure is supplied, thus a braking force is applied, to the appropriate wheel brake cylinder, for example, in the case of a hydraulic brake system, is not fixed in the device according to the present invention, but rather is variable. Since this time period is varied individually for each individual wheel of the vehicle, the wheel brakes of all the wheels are in the same state before the brake intervention which is actually necessary and foreseeable takes place. Thereby the different mechanical play which is present for the individual wheel brakes and which occurs, for example, due to the mechanical tolerances of the components used, is compensated. Thus, if a brake intervention becomes necessary, all of the wheel brakes demonstrate the same control response.

Furthermore, with the process and device according to the present invention, a more precise adjustment of the braking force is achieved, since the brake pressure which is supplied when brake intervention becomes necessary immediately results in build-up of a braking moment.

BRIEF DESCRIPTION OF THE DRAWINGS

FIG. 8a shows a first portion of a flow chart describing the functional method of the means used to detect whether or how long the slight activation of the actuators of the wheel in question is necessary, and whether or how long supply of a slight brake pressure.

FIG. 8b shows a second portion of the flow chart shown in FIG. 8a.

DETAILED DESCRIPTION OF THE DRAWINGS

Figure 1:
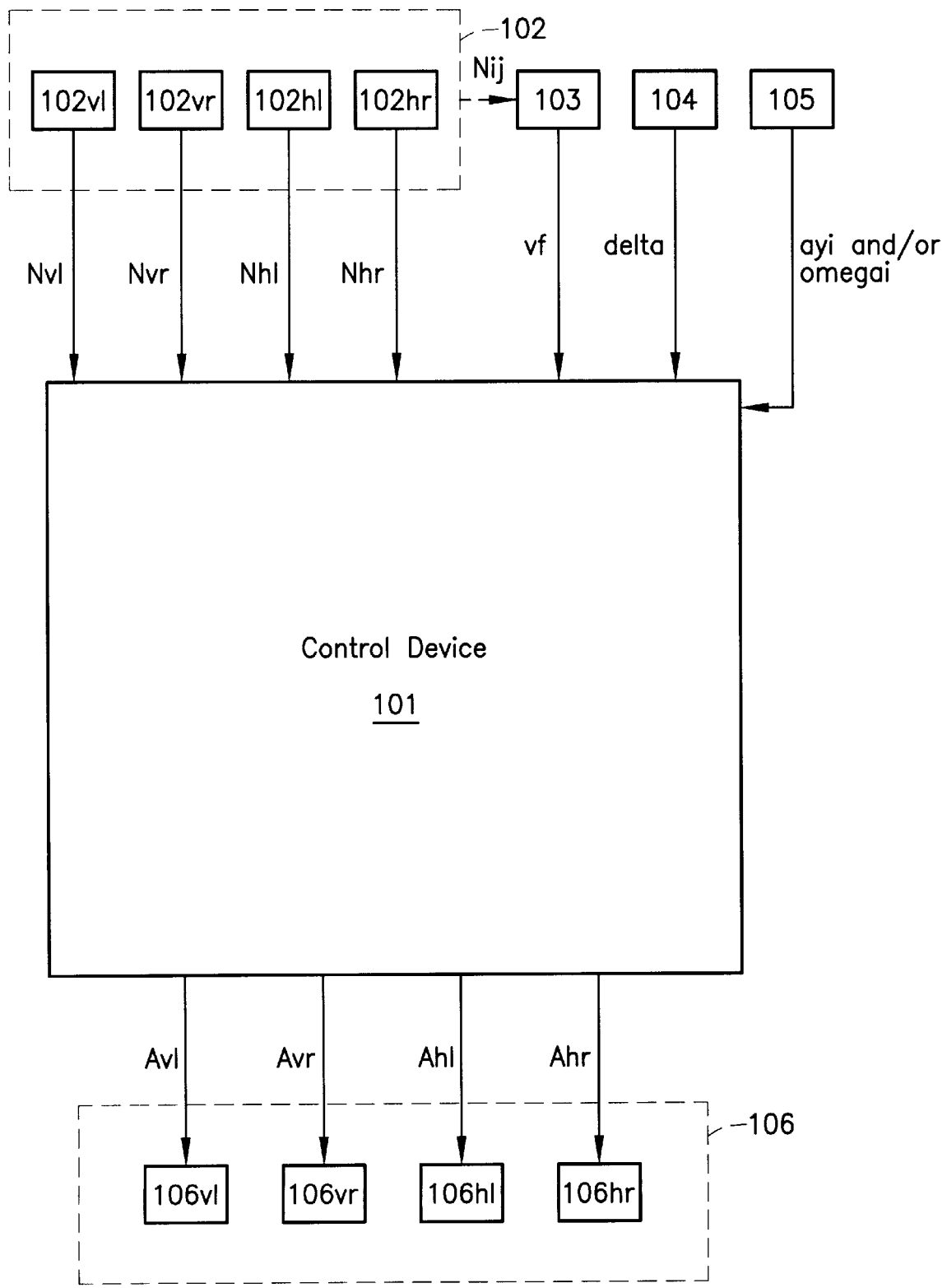
FIG. 1 shows a schematic diagram of a control device according to the present invention.

FIG. 1 shows a schematic diagram of a control device according to the present invention. The control device is referred to as 101. Wheel rotation speed sensors 102$vl$ (front left), 102$vr$ (front right), 102$hl$ (rear left), and 102$hr$ (rear right) are brought together in block 102. To simplify the reference symbols, the wheel rotation speed sensors will be referred to as 102$ij$ below. The index i indicates whether the sensor is on the rear or front axle. The index j shows the assignment to the right or left vehicle side. This identification with the two indices i and j is used analogously for all the values and components to which it applies.

Each of wheel rotation speed sensors 102$ij$ generates a signal Nij, which represents the velocity of the wheel to which wheel rotation speed sensor 102$ij$ is assigned. Signals Nij are preferably periodic signals, the frequency of which is a measure of the wheel velocity. In accordance with wheel rotation speed sensors 102$ij$, the same identification with the indices i and j applies to their signals Nij. Signal Nvl generated by wheel rotation speed sensor 102$vl$ is passed to control device 101. The same holds true for wheel rotation speed sensors 102$vr$, 102$hl$, and 102$hr$, and signals Nvr, Nhl, and Nhr generated by them.

In block 103, vehicle velocity vf is determined in known manner. In this connection, vehicle velocity vf can be determined by suitable averaging of the wheel velocities, or by support with a wheel velocity which is particularly suitable for the driving state of the vehicle in each instance. If the wheel velocities and therefore signals Nij are required for determining vehicle velocity vf, they are passed to block 103, as indicated with the broken line arrow between blocks 102 and 103. If required in block 103, signals Nij are converted to suitable signals in that block, for further processing. As an alternative to determining vehicle velocity vf using the wheel velocities, a determination by means of radar above ground or by means of suitable navigation systems is also possible. Block 103 provides a signal vf, the value of which corresponds to the vehicle velocity. This signal vf is passed to block 101.

Block 104 is used to generate a signal delta which represents the steering angle at the steerable wheels of the vehicle. Preferably, block 104 is a steering angle sensor. Signal delta which it generates is passed to control device 101. Sensor arrangement 105 can detect cross acceleration ayi of the vehicle at a certain location of the vehicle, as a cross acceleration sensor, and/or detect yaw angle velocity omegai, i.e. the angle velocity of the vehicle around its vertical axis, as a yaw rate sensor. Signals ayi and/or omegai generated by sensor arrangement 105 are also passed to control device 101. Actuators 106$ij$ are provided together in a block 106.

As a function of the input signals described above, control device 101 determines control signals Aij for actuators 106$ij$. For actuator 106$vl$, control device 101 outputs control signal Avl. This holds true analogously for actuators 106$vr$, 106$hl$, and 106$hr$, and control signals Avr, Ahl, and Ahr.

Figure 2:
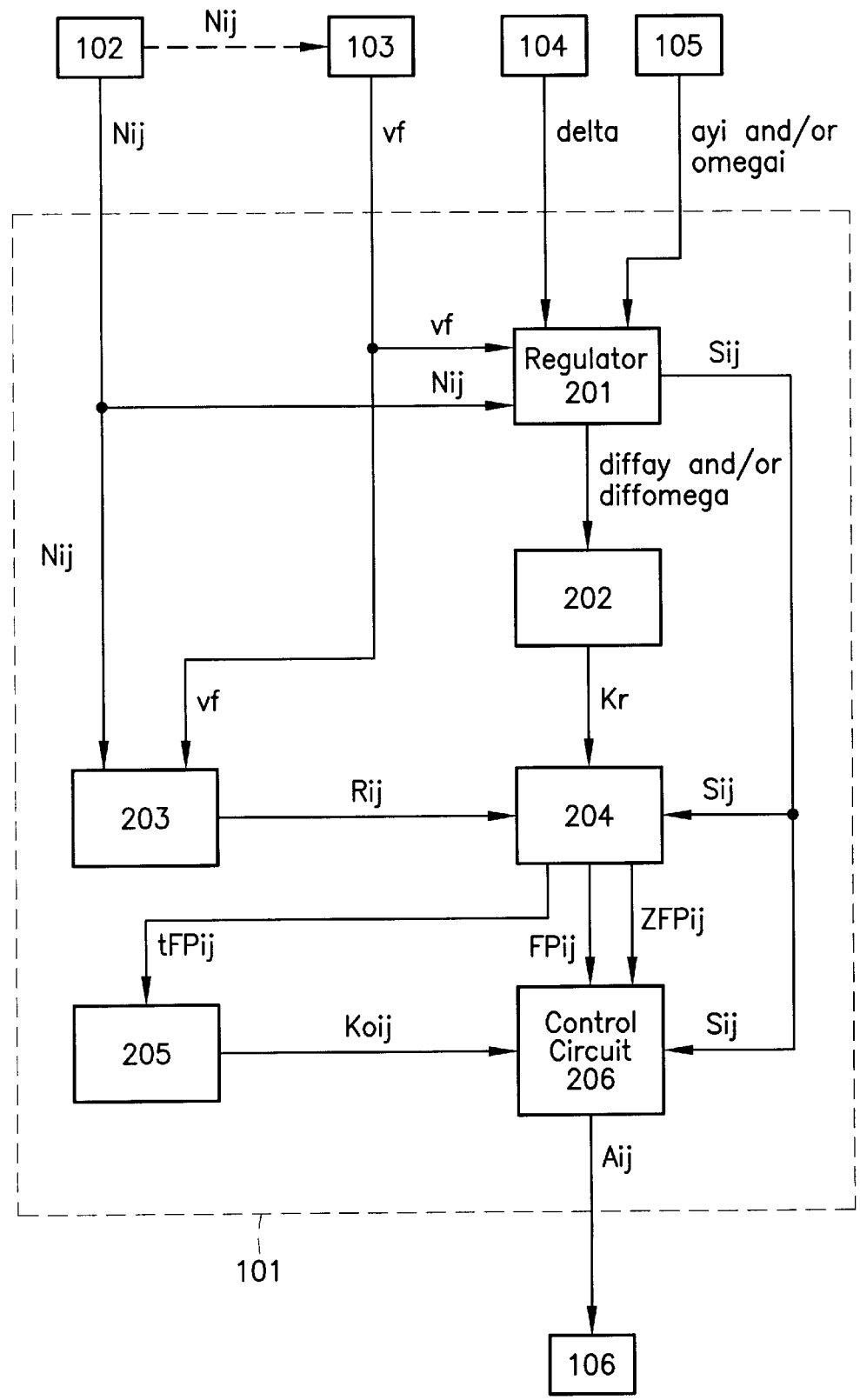
FIG. 2 shows a detailed view of the control device illustrated in FIG. 1.

The basic structure of control device 101 is shown in FIG. 2. Signals Nij generated by wheel rotation speed sensors 102$ij$ are brought together in block 102 and applied to block 201 as input signals. If vehicle velocity vf is determined as a function of wheel vevelocities in block 103, signals Nij are also passed to block 103. This is shown by the broken line of the arrow between block 102 and block 103.

Signal vf, determined in block 103, which represents the vehicle velocity, is passed to block 201. As another input signal, block 201 receives signal delta, generated using block 104, which represents the steering angle. Signals ayi, generated using sensor arrangement 105, for cross acceleration, and/or omegai for yaw angle velocity, are also passed to block 201.

Block 201 represents the regulator of control device 101. It essentially has the task of determining a system deviation, based on a comparison of reference and actual values, and generating signals for driver-independent brake intervention. Preferably, the system deviation is formed by generating the difference between the actual value and the reference value of the regulation variable. For example, a driving dynamics variable, such as cross acceleration and/or yaw angle velocity, is a possible regulation variable. Depending on the regulator concept used, regulation can take place in response to the cross acceleration and/or the yaw angle velocity. This is indicated in FIG. 2 in that variables ayi and/or omegai are passed to block 201 as input signals.

Figure 4:
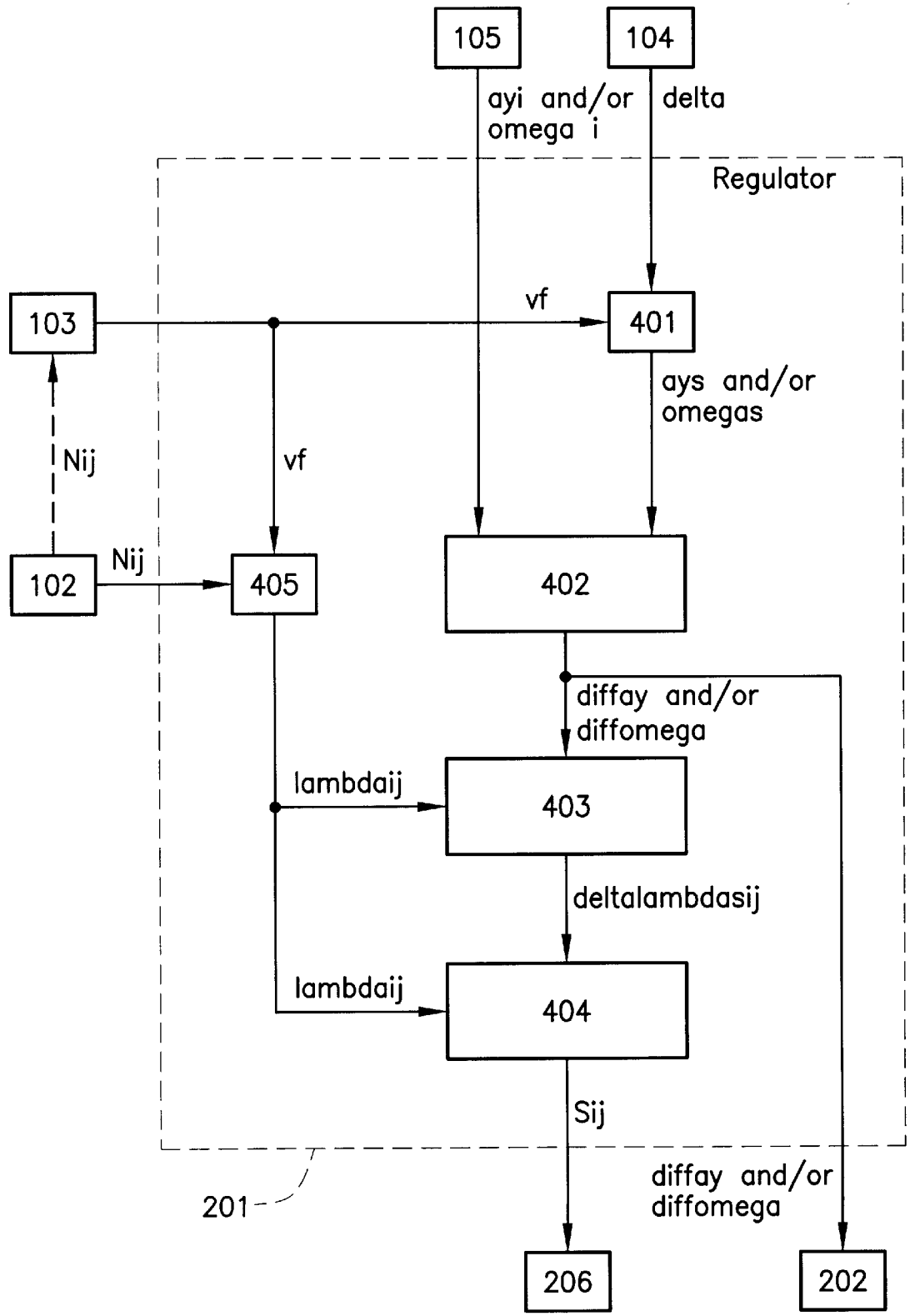
FIG. 4 shows an exemplary embodiment of the regulator provided in the control device illustrated in FIG. 3.

The system deviation determined by regulator 201 is output as signal diffay and/or diffomega, diffay representing the system deviation in case of regulation for cross acceleration, and diffomega representing the system deviation in case of regulation for yaw angle velocity. This signal diffay and/or diffomega serves as an input signal for block 202. Proceeding from control deviation diffay and/or diffomega, regulator 201 determines signals Sij, which are passed to control circuit 206 as well as block 204. Signals Sij indicate whether and to what extent a driver-independent brake intervention must be performed at the wheels of the vehicle. Preferably, additional variables can be used to determine variables Sij. The function, i.e. the basic structure of regulator 201 is shown in FIG. 4.

A criterion Kr which describes and/or influences the vehicle movement is determined in block 202, proceeding from system deviation diffay and/or diffomega. Using this criterion Kr, it is determined whether a driver-independent brake intervention is foreseeable at a wheel. Signal Kr is passed to block 204 as an input variable. The process steps executed block 202 is shown in the flow chart of FIG. 5.

Signals Nij, i.e. signal vf are also passed to block 203 as input signals. Using these input signals, block 203 determines a variable which describes the wheel dynamics for every wheel; these variables are provided as signals Rij. The functional diagram of block 203 is shown in greater detail in FIG. 7. Signals Rij are passed to block 204. As a function of signals Rij which represent the wheel dynamics for each wheel, and of signal Kr, which represents a criterion which describes and/or influences the vehicle movement, block 204 forms signals tFPij, FPij, as well as ZFPij. Signal FPij indicates whether a slight activation of the actuators, with a variable duration, is necessary for the wheel in question. Signal ZFPij indicates whether the state of the actuators in question, which was reached after the slight activation of the actuators in question, with a variable duration, is to be maintained. Signals tFPij represent a measure for the variable duration of the slight activation of the actuators assigned to the wheel in question. The variable duration of the slight activation corresponds to a control time for the actuators, in order to achieve a defined state at the actuators.

Signals tFPij are passed to block 205. Using these signals tFPij, block 205 forms correction factors Koij, with which control signals Aij for actuators 106ij and/or a variable which influences control signals Aij are corrected. Correction factors Koij can be determined, for example, by means of a comparison of times tFPij with a fixed, predetermined value tfull. For example, formation of the quotient Koij= tFPij/tfull can be used as the comparison. The value tfull corresponds to a time determined in advance, which is required, for example in the case of a hydraulic brake system, in order to build up brake pressure slightly so as to apply the brake shoes and/or the brake pads of a wheel brake in question just so much that no noteworthy brake moment is yet generated.

In accordance with the determination of correction factors as described, based on times tFPij which are determined within the scope of a braking force build-up, the correction factors can also be determined using those times which are determined within the scope of a braking force reduction.

Correction factors Koij are passed to block 206, along with signals FPij, ZFPij, and Sij. Using these signals, block 206 forms control signals Aij, with which actuators 106ij brought together in block 106 are controlled. Using signals Sij, block 206 is informed whether and to what extent a driver-independent brake intervention must be performed for a particular wheel of the vehicle. Using signal FPij, block 206 is informed for what wheel a slight activation of the actuators in question, with a variable duration, is necessary ahead of the foreseeable driver-independent brake intervention. Signal ZFPij contains the information whether the state achieved at the wheel brake in question, after the slight activation of the actuators in question, with a variable duration, is to be maintained.

Regulator 201, which is contained in control device 101, can function according to different regulation concepts. This means that cross acceleration ayi at a certain location of the vehicle and/or yaw angle velocity omegai of the vehicle, for example, can be used as a regulation variable. Depending on the regulation concept of regulator 201 which is selected, a different sensor configuration is required for determining the actual value of the regulation variable, as shown in FIG. 3.

Figure 3:
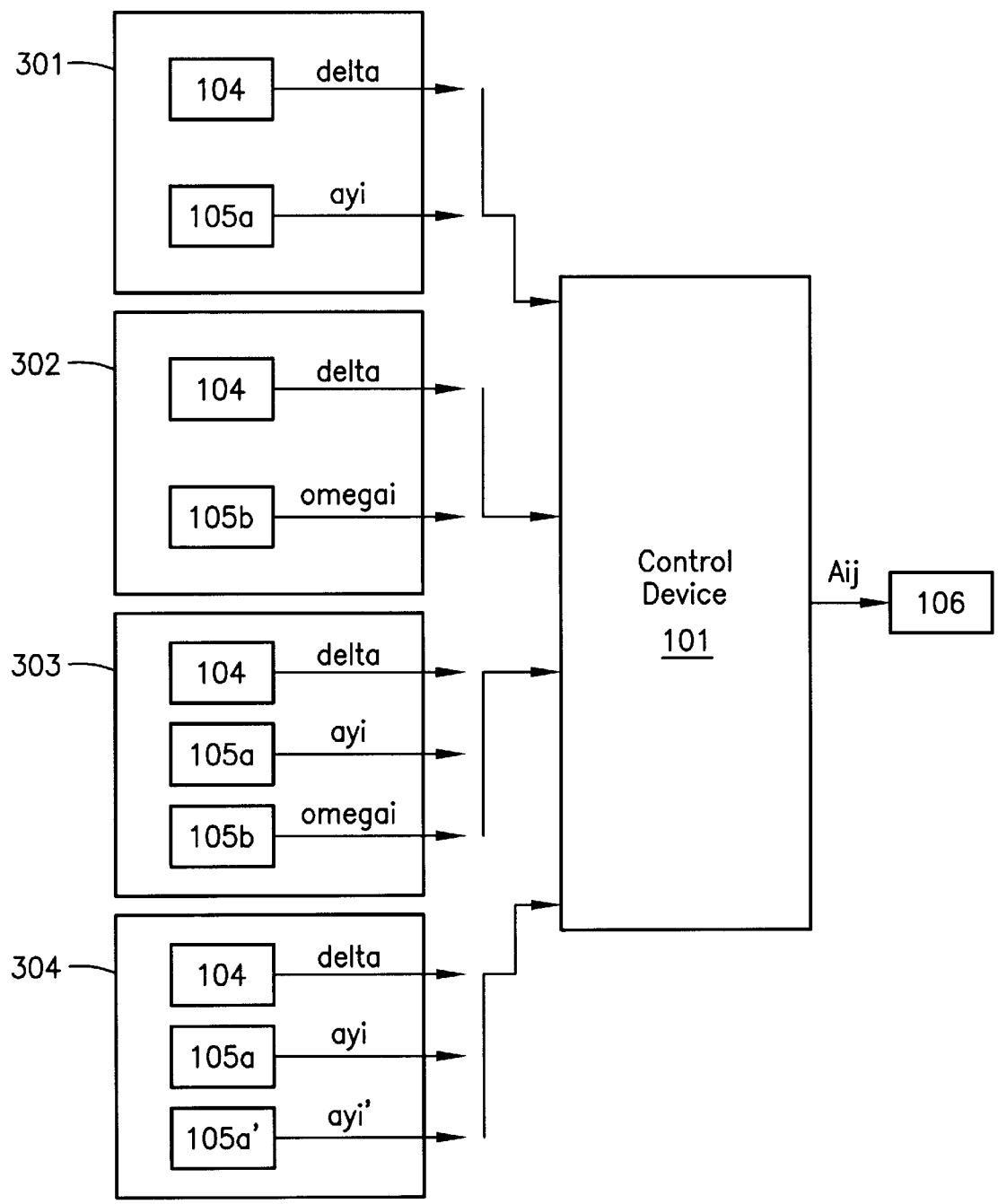
FIG. 3 shows various sensor configurations for determining driving dynamics values, which are required for a description of the criterion which describes and/or influences vehicle movement.

FIG. 3 shows control device 101. This generates control signals Aij, with which actuators 106ij, brought together in block 106, are controlled. Furthermore, FIG. 3 shows blocks 301, 302, 303, and 304, each of which represents a different sensor configuration. As a function of the regulator concept selected, according to which regulator 201 functions, one of these four sensor configurations can be used as an alternative.

Sensor configuration 301 contains the following components: Block 104 is a sensor means used to detect the steering angle taken at the steerable wheels, and generating a corresponding signal delta, the value of which corresponds to the steering angle. Preferably, sensor means 104 is a steering angle sensor. Sensor means 105a preferably represents a cross acceleration sensor, with which the cross acceleration which affects the vehicle at a certain location can be detected, and which generates a corresponding signal ayi, the value of which corresponds to the cross acceleration.

Analogous to sensor configuration 301, sensor configuration 302 also contains sensor means 104 for detecting steering angle delta. Sensor means 105b, contained in sensor configuration 302, serves to detect the yaw angle velocity of the vehicle around its vertical axis, and to generate a corresponding signal omegai, the value of which corresponds to the yaw angle velocity. Preferably, sensor means 105b is structured as a yaw rate sensor.

Sensor configuration 303 also contains sensor means 104 for detecting the steering angle. In addition to this, sensor configuration 303 contains sensor means 105a with which the cross acceleration which affects the vehicle at a certain location can be detected, and with which a corresponding signal ayi can be output. Preferably, this sensor means 105a is structured as a cross acceleration sensor. Using sensor means 105b, the yaw angle velocity of the vehicle around its vertical axis is detected, and a corresponding signal omegai is generated. Preferably, sensor means 105b is structured as a yaw rate sensor.

Analogous to the other sensor configurations, sensor configuration 304 also contains sensor means 104 for determining the steering angle and outputting a corresponding signal delta. Sensor means 105a is structured in accordance with the means contained in sensor configuration 303. Sensor means 105a', analogous to sensor means 105a, serves to detect the cross acceleration which affects the vehicle at a second specific location and to generate a corresponding signal ayi'. Corresponding to sensor means 105a, sensor means 105a' is also preferably structured as a cross acceleration sensor. Based on the two cross accelerations ayi and ayi' which affect the vehicle at two different locations, a conclusion can be drawn concerning the yaw angle velocity of the vehicle around its vertical axis. Therefore the use of two cross acceleration sensors represents an alternative to the use of a yaw rate sensor. This is taken into consideration in FIGS. 1, 2, and 4, by using block 105. Depending on the regulation concept which is implemented in regulator 201, block 105 represents a configuration consisting of sensor means 105a and/or 105a' and/or 105b, in accordance with sensor configurations 301, 302, 303, or 304 shown in FIG. 3.

FIG. 4 shows the basic structure of regulator 201 contained in control device 101. Using wheel rotation speed sensors 102ij brought together in block 102, signals Nij which describe the wheel velocities of the individual wheels are generated. Optionally, these are passed to block 103. In block 103, the vehicle velocity is determined. Signal vf, which represents the wheel velocity, is passed to block 401. In addition, signal delta, which represents the steering angle, and is generated using sensor means 104, is passed to block 401. Block 401 represents a means (or device) for calculating or determining the reference value of the regulation variable used in regulator 201. If regulator 201 is based on the cross acceleration which affects the vehicle at a certain location as the regulation variable, a reference value ays is determined for the cross acceleration in block 401. If, on the other hand, the yaw angle velocity of the vehicle around its vertical axis is the regulation variable, a reference value omegas is determined in block 401. Both the determination of reference value ays for the cross acceleration of the vehicle and the determination of reference value omegas for the yaw angle velocity of the vehicle can take place, for example, using a corresponding mathematical model, with at least vehicle velocity vf and steering angle delta serving as input variables.

Reference value ays for the cross acceleration and/or reference value omegas for yaw angle velocity is passed to block 402. The values for the cross acceleration ayi which affects the vehicle at a certain location, and/or the yaw angle velocity omegai, determined using sensor arrangement 105, represent the actual values of the corresponding variables. Actual value ayi for the cross acceleration which affects the vehicle at a certain location, and/or actual value omegai for the yaw angle velocity of the vehicle, are passed to block 402. System deviation diffay for the cross acceleration and/or system deviation diffomega for the yaw angle velocity of the vehicle are determined using block 402. For example, the determination of the system deviation can take place by forming the difference of the actual value and the reference value. System deviation diffay for the cross acceleration and/or system deviation diffomega for the yaw angle velocity of the vehicle are passed to block 403 and block 202 at the same time.

Signals Nij as well as signal vf are passed to block 405 as input signals. The current values lambdaij of the slip present at the wheel in question are determined as a function of signals Nij as well as signal vf. The current slip values lambdaij are passed to block 403 and block 404 at the same time. In block 403, reference slip changes deltalambdaij are determined for the wheels in question, as a function of system deviation diffay for the cross acceleration and/or system deviation diffomega for the yaw angle velocity of the vehicle, and the current values, i.e. actual values lambdaij, for the slip of the wheel in question. The use of system deviation diffay for the cross acceleration and/or system deviation diffomega for the yaw angle velocity of the vehicle and the use of the actual value lambdaij for the slip values does not represent a restriction for the determination of reference slip changes deltalambdaij. Of course other variables such as the slant angle and/or the resulting tire forces can be used to calculate reference slip changes deltalambdaij. Reference slip changes deltalambdaij are passed to block 404 as another input signal. Block 404 forms control signals Sij for control unit 206 of actuators 105ij as a function of reference slip changes deltalambdaij and actual value lambdaij.

Figure 5B:
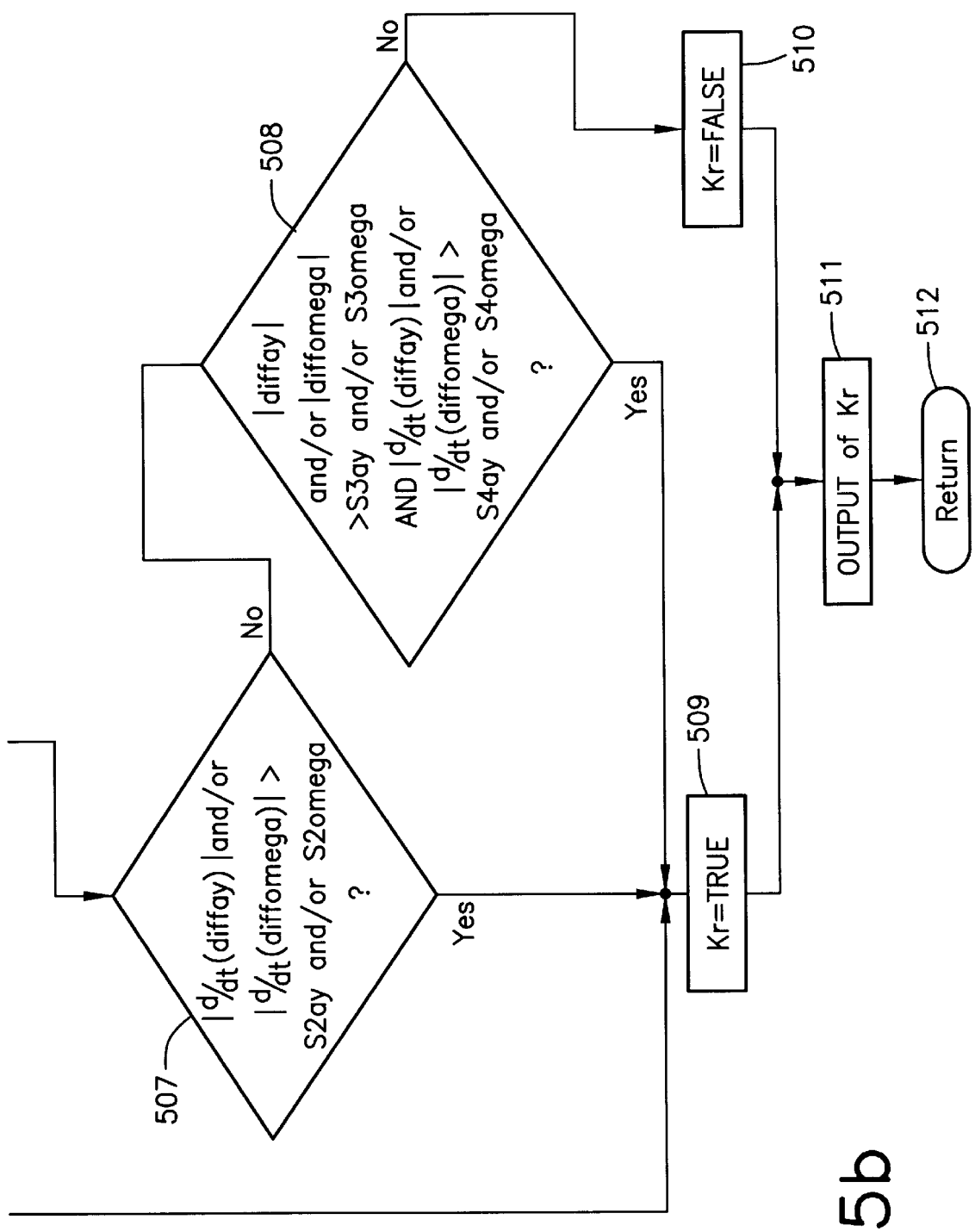
FIG. 5 shows a flow diagram of the method determining a criterion which describes and/or influences vehicle movement.

The determination of the criterion which describes and/or influences the vehicle velocity, as it takes place in block 202, will be described using the flow chart of FIG. 5. The determination of the criterion which describes and/or influences the vehicle velocity starts with step 501. In the subsequent step 502, system deviation diffay for the cross acceleration and/or system deviation diffomega for the yaw angle velocity of the vehicle is read in. In the next step 503, the amount of system deviation diffay and/or the amount of system deviation diffomega is formed. During the subsequent step 504, the time derivation of system deviation diffay is formed in accordance with d(diffay)/dt and/or the time derivation of system deviation diffomega is formed in accordance with d(diffomega)/dt. In the next step 505, the amount of the time derivation of system deviation diffay and/or the amount of the time derivation of system deviation diffomega is determined. Step 505 is followed by step 506.

Using the inquiries which take place in steps 506, 507, and 508, a determination is made as to whether a driver-independent brake intervention is foreseeable. Depending on the result of this assessment, a corresponding value is assigned to signal Kr.

The inquiries contained in steps 506, 507, and 508 represent a possibility of how the criterion Kr which describes and/or influences the vehicle movement can be determined. This possibility is not intended to represent any restriction. Of course system deviation diffay and/or system deviation diffomega can be used alone, or the time derivation of system deviation diffay and/or system deviation diffomega can be used alone, or a combination of the two can be used for determining the criterion Kr.

In step 506, a first inquiry is conducted. For this purpose, the amount of system deviation diffay of the cross acceleration is compared with a first threshold value S1ay for the system deviation of the cross acceleration, and/or the amount of system deviation diffomega for the yaw angle velocity of the vehicle is compared with a first threshold value S1omega for the system deviation of the yaw angle velocity of the vehicle. If it is found, in this comparison, that the amount of system deviation diffay is greater than first threshold value S1ay, and/or if it is found that the amount of system deviation diffomega is greater than first threshold value S1omega, step 509 is performed as the next step.

If, on the other hand, it is found, in the comparison which takes place in step 506, that the amount of system deviation diffay is less than first threshold value S1ay, and/or that the amount of system deviation diffomega is less than first threshold value S1omega, step 507 is performed as the next step.

In step 507, a second inquiry takes place. For this purpose, the amount of the time derivation of system deviation diffay of the cross acceleration is compared with a second threshold value S2ay for the time derivation of the system deviation of the cross acceleration, and/or the amount of the time derivation of system deviation diffomega for the yaw angle velocity of the vehicle is compared with a second threshold value S2omega for the time derivation of the system deviation of the yaw angle velocity of the vehicle. If it is found, in the comparison which takes place in step 507, that the amount of the time derivation of system deviation diffay is greater than second threshold value S2ay, and/or if it is found that the amount of the time derivation of system deviation diffomega is greater than second threshold value S2omega, step 509 is performed as the next step.

If, on the other hand, it is found, in the inquiry which takes place in step 507, that the amount of the time derivation of system deviation diffay is less than the second threshold value, and/or that the amount of the time derivation of system deviation diffomega is less than second threshold value S2omega, step 508 is performed as the next step.

Another inquiry takes place in step 508. For this purpose, in step 508, the amount of system deviation diffay of the cross acceleration is compared with a third threshold value S3ay for the system deviation of the cross acceleration, and/or the amount of system deviation diffomega for the yaw angle velocity of the vehicle is compared with a third threshold value S3omega for the system deviation of the yaw angle velocity of the vehicle.

At the same time, the amount of the time derivation of system deviation diffay of the cross acceleration is compared with a fourth threshold value S4ay for the time derivation of the system deviation of the cross acceleration, and/or the amount of the time derivation of system deviation diffomega for the yaw angle velocity of the vehicle is compared with a fourth threshold value S4omega for the time derivation of the system deviation of the yaw angle velocity.

If it is found, in these comparisons, that the amount of system deviation diffay is greater than third threshold value S3ay, and/or that the amount of system deviation diffomega is greater than third threshold value S3omega, and if at the same time it is found that the amount of the time derivation of system deviation diffay is greater than fourth threshold value S4ay, and/or that the amount of the time derivation of system deviation diffomega is greater than fourth threshold value S4omega, then step 509 is performed as the next step. If, on the other hand, it is found, in the comparison, that the amount of system deviation diffay is less than third threshold value S3ay, and/or that the amount of system deviation diffomega is less than third threshold value S3omega, or, at the same time, it is found that the amount of the time derivation of system deviation diffay is less than fourth threshold value S4ay, and/or that the amount of the time derivation of system deviation diffomega is less than fourth threshold value S4omega, then step 510 is performed as the next step.

In step 509, the value TRUE is assigned to signal Kr. As the next step, step 511 is performed. In step 510, the value FALSE is assigned to signal KR. After step 510, step 511 is performed as the next step. In step 511, signal Kr is output.

Using signal Kr, the further processing means present in the control device are informed whether a driver-independent brake intervention is foreseeable. If signal Kr has the value TRUE, this means that a driver-independent brake intervention is foreseeable. If, on the other hand, signal Kr has the value FALSE, this means that no driver-independent brake intervention is foreseeable.

The determination of the criterion on the basis of which it can be decided whether or not a driver-independent brake intervention is foreseeable ends with step 512.

The criterion which describes and/or influences the vehicle movement, and is formed by the inquiries in steps 506, 507, and 508, will be explained in greater detail using FIGS. 6a, 6b, 6c, and 6d.

FIGS. 6a, 6b, 6c, and 6d show the time progression of the actual value and the reference value of a regulation variable. Here, for example, the yaw angle velocity of the vehicle around its vertical axis has been selected as the regulation variable. The reference value of the regulation variable is referred to as omegas, and the actual value of the regulation variable is referred to as omegai. The point in time at which the inquiries of steps 506, 507, and 508 are performed is referred to as t0. FIGS. 6a, 6b, 6c, and 6d show different behavior as far as the actual value of the regulation variable is concerned. In all four cases, the progression of reference value omegas of the regulation variable is assumed to be identical.

To perform the inquiries contained in steps 506, 507, and 508, both the system deviation of the regulation variable (diffay and/or diffomega) and the time derivation of the system deviation (d(diffay)/dt or d(diffomega)/dt) are taken into consideration. Therefore the criterion which describes and/or influences the vehicle movement is formed as a function of the system deviation and the time derivation of the system deviation. In this connection, the system deviation is the deviation of the actual value of a driving dynamics variable, for example the cross acceleration and/or the yaw angle velocity of the vehicle, from a reference value predetermined for this variable.

The inquiry in step 506 determines whether the system deviation of the cross acceleration and/or that of the yaw angle velocity of the vehicle is greater than a first threshold value. If this is the case, then this is an indication that a driver-independent brake intervention performed by the regulator is foreseeable. Consequently, signal Kr is assigned value TRUE in step 509.

In step 507, the amount of the time derivation of the system deviation of the cross acceleration and/or that of the yaw angle velocity of the vehicle is compared with a second threshold value. If the amount of the time derivation of the system deviation of the cross acceleration and/or that of the yaw angle velocity of the vehicle is greater than the second threshold value, then this is an indication that a driver-independent brake intervention performed by the regulator is foreseeable. For this reason, signal Kr is assigned value TRUE in step 509.

The inquiry performed in step 508 combines an inquiry concerning the amount of the system deviation of the cross acceleration and/or that of the yaw angle velocity of the vehicle with an inquiry concerning the amount of the time derivation of the system deviation of the cross acceleration and/or that of the yaw angle velocity. If the amount of the system deviation of the cross acceleration and/or that of the yaw angle velocity of the vehicle is greater than a third threshold value, and if at the same time the amount of the time derivation of the system deviation of the cross acceleration and/or that of the yaw angle velocity of the vehicle is greater than a fourth threshold value, this is an indication that a driver-independent brake intervention performed by the regulator is foreseeable. Consequently, signal Kr is assigned value TRUE in step 509.

The following relationships apply for the threshold values: Threshold value S1ay is greater than threshold value S3ay. The same holds true for threshold value S1omega and threshold value S3omega. Furthermore, threshold value S2ay is greater than threshold value S4ay. The same holds true for threshold value S2omega and threshold value S4omega. Taking into consideration the inquiries in steps 506, 507, and 508, this means: If a driving state is present for the vehicle, in which the amount of system deviation diffay and/or that of system deviation diffomega takes on a value which is greater than a first threshold value—this driving state is determined by the inquiry in step 506—then it can be assumed that a driver-independent brake intervention is foreseeable. Likewise, a driver-independent brake intervention can be assumed to be necessary if a driving state of the vehicle is present in which the amount of the time derivation of system deviation diffay and/or that of system deviation diffomega is greater than a second threshold value. These driving states are detected by the inquiry in step 507. Likewise, in the case of a driving state of the vehicle in which the amount of system deviation diffay and/or that of system deviation diffomega is greater than the first threshold value, and, at the same time, the amount of the time derivation of system deviation diffay and/or that of system deviation diffomega is greater than the second threshold value, a driver-independent brake intervention can be foreseen as being necessary. Such driving states of the vehicle are determined by means of the inquiry in step 508.

It should be pointed out that the time derivation of the system deviation is equal in meaning to the gradient of the system deviation.

In the following, the inquiries contained in steps 506, 507, and 508 will be explained again using the curve progressions shown in FIGS. 6a, 6b, 6c, and 6d.

Figure 6A:
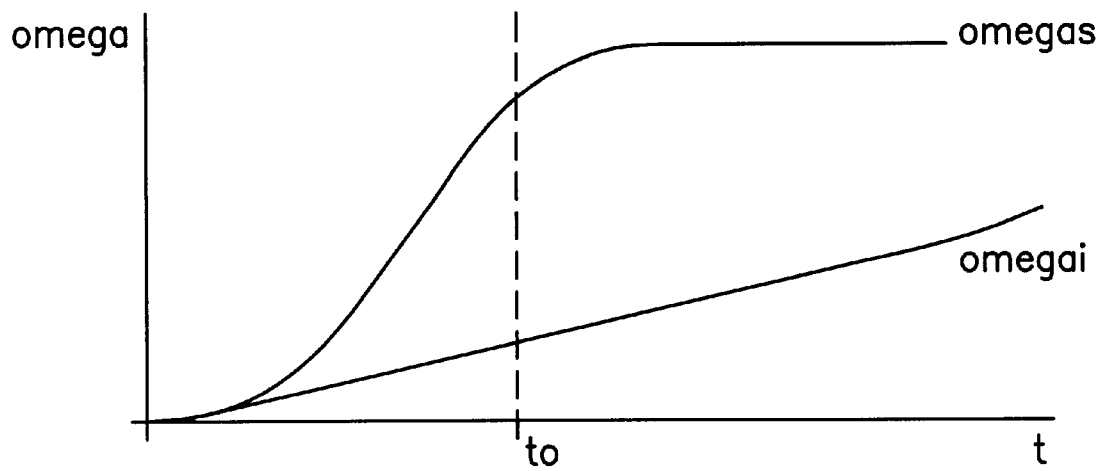
FIG. 6a shows a first functional sequence corresponding to the flow diagram illustrated in FIG. 5.

The progression of actual value omegai of the regulation variable as shown in FIG. 6a shows a great deviation from the progression of reference value omegas of the regulation variable. Assuming that the deviation which corresponds to the system deviation is greater than first threshold value S1omega, the inquiry in step 506 finds, at time t0, that a driver-independent brake intervention is foreseeable.

Figure 6B:
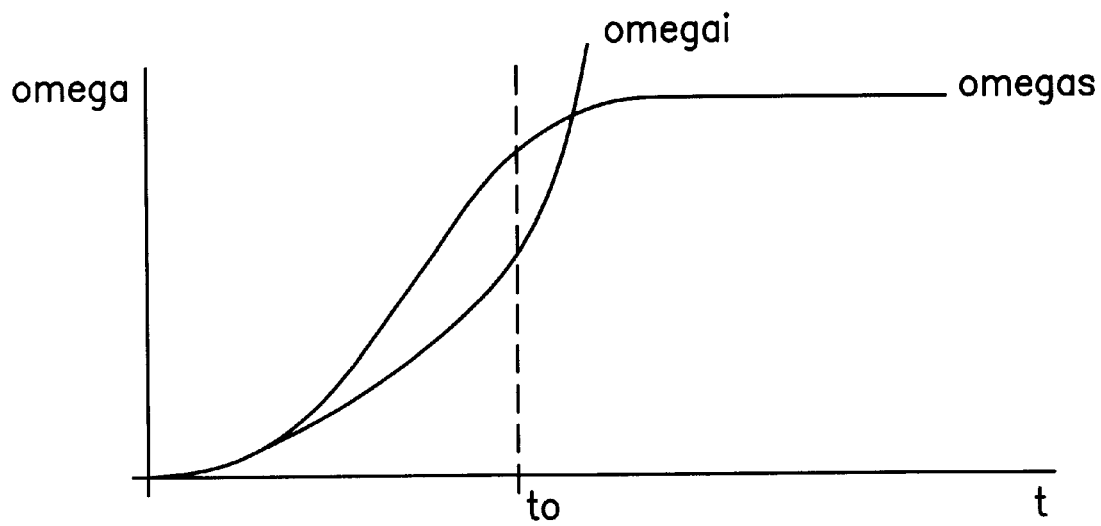
FIG. 6b shows a second functional sequence corresponding to the flow diagram illustrated in FIG. 5.

While the progression of actual value omegai of the regulation variable as shown in FIG. 6b does not show a very great deviation from the progression of reference value omegas, it does show a very steep gradient. Because of the steep gradient of actual value omegai, it can be concluded that within a short period of time, a great system deviation will exist between the actual value and the reference value of the regulation variable. Here it is assumed that a steep gradient of the system deviation is also connected with a steep gradient of actual value omegai. Assuming that the deviation which corresponds to the system deviation is less than first threshold S1omega and assuming that the time derivation, i.e. the gradient of the deviation—the time derivation of the deviation corresponds to the time derivation of the system deviation—is greater than second threshold value S2omega, this driving state is detected at time t0 by the inquiry in step 507. This means that the inquiry in step 507 determines, for this driving state, that a driver-independent brake intervention is foreseeable.

Figure 6C:
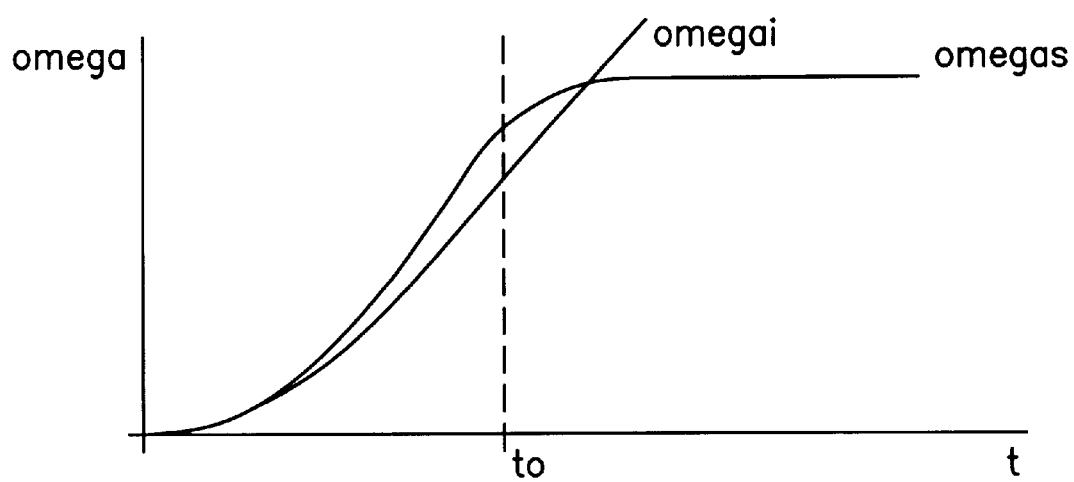
FIG. 6c shows a third functional sequence corresponding to the flow diagram illustrated in FIG. 5.

The progression of actual value omegai shown in FIG. 6c shows a slight deviation from the progression of reference value omegas at time t0. At the same time, the progression of actual value omegai at time t0 shows a flat gradient. Because of this combination of slight system deviation and small gradient of the progression of the actual value, a relatively great system deviation between actual value omegai and reference value omegas of the regulation variable is to be expected within a short period of time. Assuming that the system deviation is less than first threshold S1omega, but greater than third threshold S3omega, and the time derivation of the system deviation is less than second threshold S2omega, but greater than fourth threshold S4omega, this driving state is detected by the inquiry in step 508 at time t0. This means that the inquiry in step 508 determines that a driver-independent brake intervention is foreseeable for such driving states.

Figure 6D:
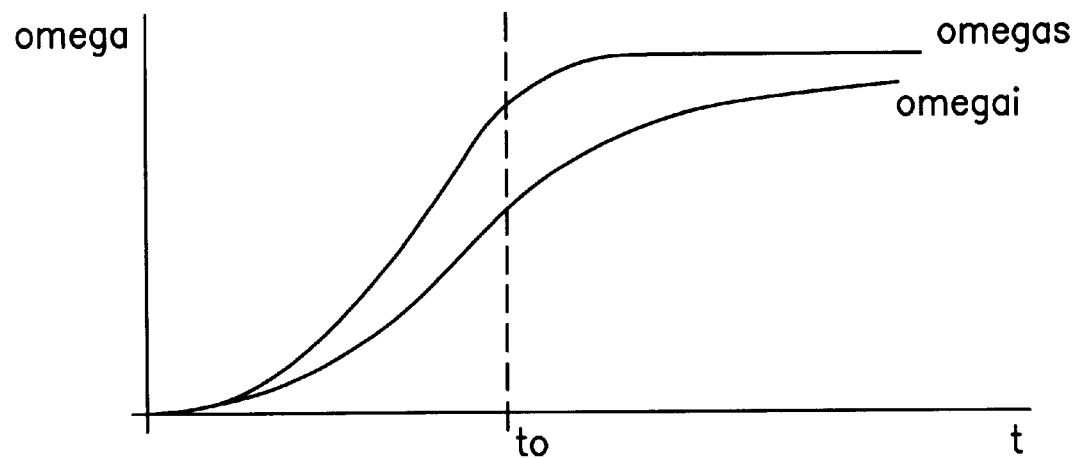
FIG. 6d shows a fourth functional sequence corresponding to the flow diagram illustrated in FIG. 5.

The progression of actual value omegai shown in FIG. 6d has a medium deviation relative to the progression of reference value omegas at time t0. At the same time, the progression of the actual value has a flat gradient. Assuming that this driving state does not fulfill the inquiries of steps 507, 508, and 509, it can be assumed that the progression of actual value omegai will approach the progression of reference value omegas with an increasing time duration. Consequently, no driver-independent brake intervention is foreseeable with this progression.

Figure 7:
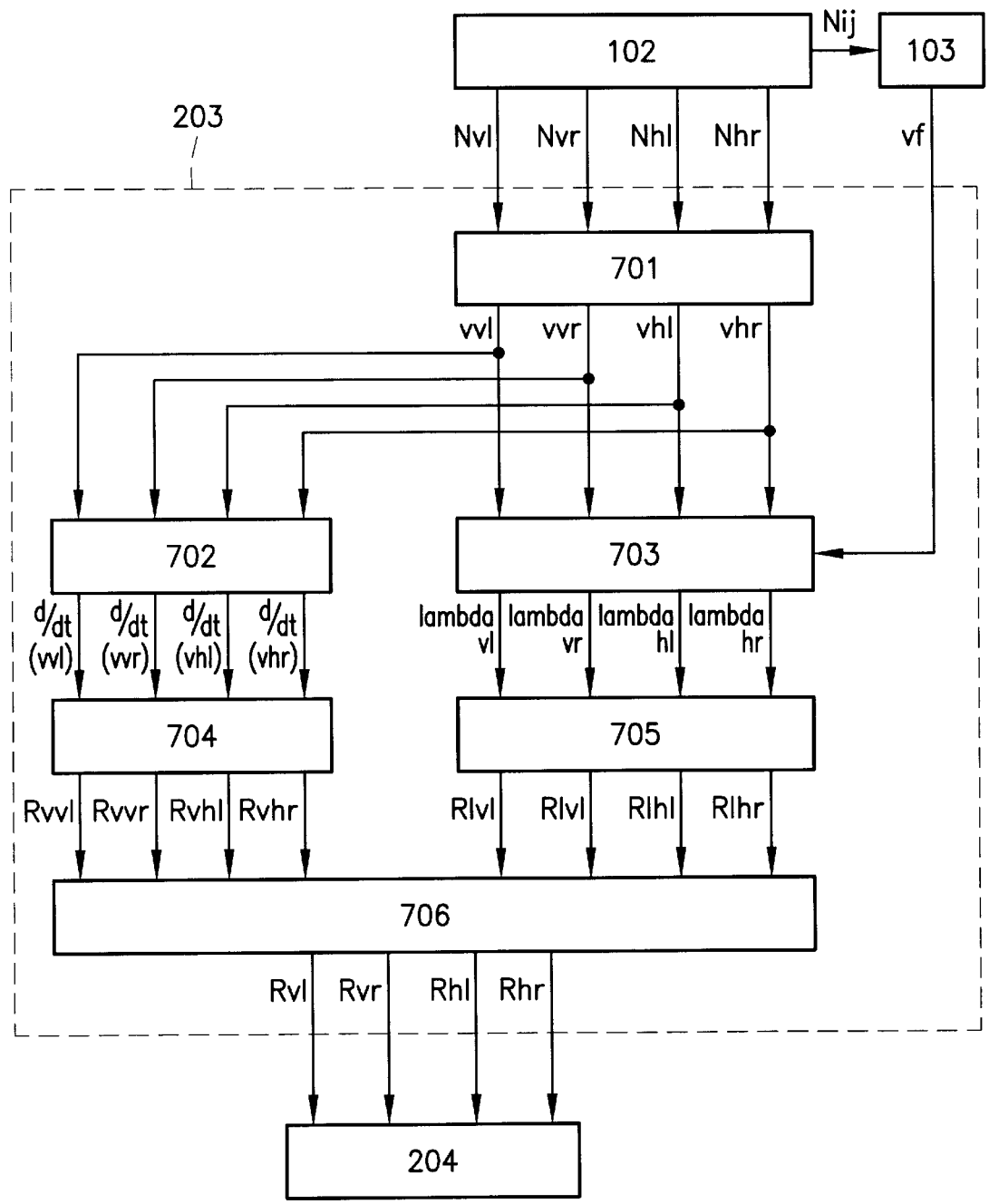
FIG. 7 shows a schematic diagram of means to determine the value describing the wheel dynamics.

FIG. 7 shows the basic structure of block 203, in which the variables Rij which describe the wheel dynamics of the wheels are determined. Signals Nvl, Nvr, Nhl, and Nhr are passed to block 701. Proceeding from these input signals, block 701 forms the velocity signals vvl, vvr, vhl, and vhr of the wheels. These are simultaneously passed to blocks 702 and 703. In block 702, a time derivation is determined for each of the velocity signals. Block 702 outputs signals d(vvl)/dt, d(vvr)/dt, d(vhl)/dt, and d(vhr)/dt as output signals. The values of these signals describe the wheel deceleration or the wheel acceleration of the individual wheels. These signals are passed to block 704 as input signals. Based on these input signals, block 704 forms variables Rvvl, Rvvr, Rvhl, and Rvhr which describe the wheel dynamics of the wheels. These variables are passed to block 706 as signals Rvij.

In addition to velocity signals vvl, vvr, vhl, and vhr, signal vf is also passed to block 703. Proceeding from these variables, block 703 forms the current slip values present at the wheels, lambdavl, lambdavr, lambdahl, and lambdahr. These variables are passed to block 705 as signals lambdaij. Proceeding from these variables, block 705 determines the variables Rlvl, Rlvr, Rlhl, and Rlhr, which also describe the wheel dynamics of the wheel in question. These variables are also passed to block 706 as signals Rlij.

As a function of the input variables Rvij, which are based on the wheel deceleration or the wheel acceleration of the wheels, i.e. as a function of the variables Rlij, which are based on the current slip of the wheels, block 706 forms the variables Rvl, Rvr, Rhl, and Rhr which describe the wheel dynamics of the wheel in question. These variables are passed to block 204 as signals Rij.

The above description of how the variables Rij are determined is only exemplary. For example, it can be advantageous to determine the variables Rij only as a function of the variables Rvij, and in this case, blocks 703 and 705 are no longer necessary. On the other hand, it can also be advantageous to determine the variables Rij only as a function of the variables Rlij. Here blocks 702 and 704 would no longer be necessary. However, variables Rij can also be determined by combining variables Rvij and Rlij, as shown in FIG. 7.

Signals Rvij can be formed, for example, by a comparison of time derivations of wheel velocities d(vij)/dt with a corresponding threshold value Svij. If, for example, time derivation d(vij)/dt is greater than threshold value Svvl, the value TRUE is assigned to signal Rvvl, indicating that the wheel dynamics criterion has been fulfilled for the left front wheel. If, on the other hand, the value of time derivation d(vvl)/dt is less than threshold value Svvl, signal Rvvl is assigned the value FALSE. The same procedure can be followed for signals Rlij, but different threshold values Slij could be used.

Figure 8B:
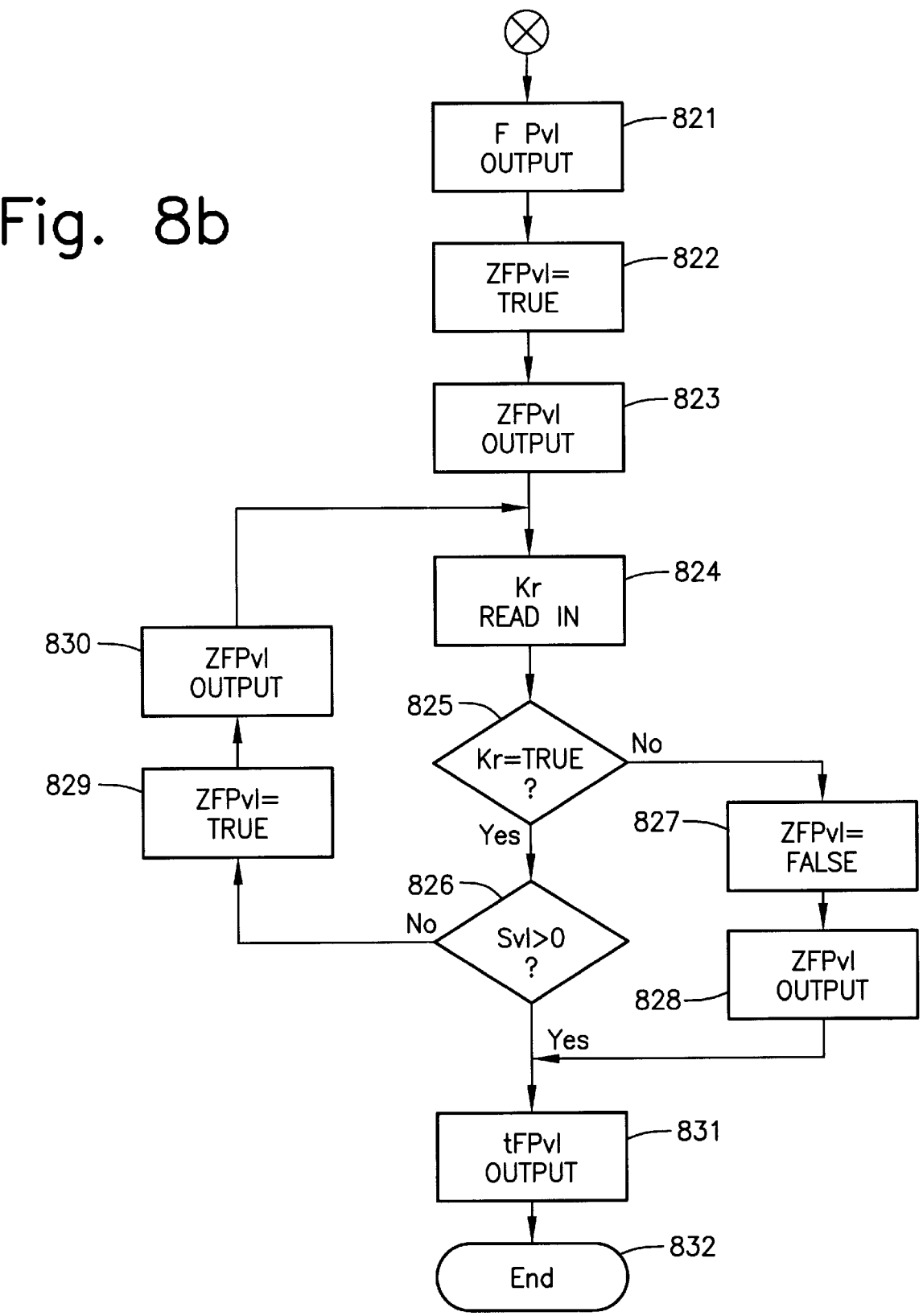

The flow chart shown in FIGS. 8a and 8b describes the operational sequences, i.e. the functional method of block 204 using the left front wheel as an example. This flowchart is only exemplary and does not represent any restriction on the present invention. In addition, the fact that only one operation is performed in each step is also exemplary; it would certainly be possible to combine several operations in one step. Under some circumstances it might be advantageous to change the arrangement of the individual steps.

The flow chart starts with step 801. In the next step 802, variable Kr is read in, which indicates whether a driver-independent brake intervention is foreseeable. In the subsequent step 803, variable Kr is checked as to whether it possesses the value TRUE. If variable Kr does not possess the value TRUE, step 835 is performed as the next step, ending the sequence of operations. If variable Kr does possess the value TRUE, i.e. if a driver-independent brake intervention is foreseeable, step 804 is performed as the next step.

In block 804, time signal tFPvl is initialized, i.e. it is assigned the value zero. In the following step 805, variables Kr, Svl, and Rvl are read in. In the next step 833, the value of signal Svl is checked as to whether it is less than zero. If the value for Svl is less than zero, regulator 201 specifies that the braking force at the wheel in question must be reduced. Since no build-up of braking force is to be achieved in this case, the remainder of the procedure described by the flow chart does not have to be performed. Therefore if the value of Svl is less than zero, step 834 is performed as the next step, and therefore the operational sequence ends. If the value of Svl is greater than zero, step 806 is performed as the next step. In step 806, the value of signal tFPvl is compared with the fixed, predetermined value tfüll. The variable tfüll is an experimentally determined time period. It is dimensioned in such a way that a slight activation of actuators 106*ij* which takes place during this time tfüll normally does not achieve any braking effect on the wheels. If the inquiry in step 806 shows that time tFPvl is greater than time tfüll, then assuming that the slight activation of actuators 106*ij* has been concluded, step 811 is performed as the next step.

The inquiry performed in step 811, whether signal Svl takes on a value greater than zero, determines whether regulator 201 will immediately perform an active brake intervention because of the driving state of the vehicle. If signal Svl possesses a value greater than zero, regulator 201 will immediately perform an active brake intervention. Step 812 is performed next. Here the value FALSE is assigned to signal FPvl. In the subsequent step 813, signal FPvl is output. This indicates to the later blocks of control device 101 that the slight activation of actuators 106$ij$ has ended. In the next step 814, value tFPvl is output. The subsequent step 815 ends the operational sequence in block 204.

If it is determined in step 811 that the value of signal Svl does not differ from zero, i.e. if regulator 201 will not perform a driver-independent brake intervention, step 816 is performed next.

In step 816, an inquiry occurs whether signal Rvl has the value FALSE, and whether signal Kr has taken on the value TRUE. This inquiry determines whether the left front wheel already fulfills the wheel dynamics criterion and whether a driver-independent brake intervention is foreseeable. If this condition is fulfilled, step 817 is therefore performed next. In this step, the value TRUE is assigned to signal FPvl. Then signal FPvl is output in step 818. Subsequently, time signal tFPvl is increased by value deltat in step 819. Following step 819, step 805 is performed once again.

If the condition contained in the inquiry is not fulfilled in step 816, step 820 is performed next.

If the inquiry in step 806 shows that the value of time signal tFPvl is less than value tfull, step 807 is performed next. In step 807, the same inquiry takes place as in step 816. If the condition of the inquiry in step 807 is fulfilled, step 808 is performed next. In step 808, signal FPvl is assigned the value TRUE. In the subsequent step 809, signal FPvl is output. In the following step 810, time signal tFPvl is increased by value deltat. Following this, step 805 is performed once again.

If the condition contained in the inquiry is not fulfilled in step 807, step 820 is performed next. In step 820, the value FALSE is assigned to signal FPvl. Step 820 is followed by step 821. In this step, signal FPvl is output. Following this, the value TRUE is assigned to signal ZFPvl in step 822. This signal is output in step 823. In the subsequent step 824, signal Kr is read in. This is evaluated in the subsequent step 825. In step 826, the value of signal Svl is checked as to whether it is greater than zero. If the value of signal Svl is not greater than zero, step 829 is performed as the next step. In this step, the value TRUE is assigned to signal ZFPvl. In step 830, signal ZFPvl is output. After step 830, step 824 is performed again.

If it is found, in step 825, that signal Kr has not taken on the value TRUE, step 827 is performed next. In this step, signal ZFPvl is assigned the value FALSE. Signal ZFPvl is output in the subsequent step 828. Following step 828, step 831 is performed.

If it is found, in step 826, that the value of signal Svl is greater than zero, processing continues with step 831. In this step, the value of time signal tFPvl is output. Processing ends with step 832.

Because steps 817, 818, and 819 are performed as long as the condition contained in step 816 is fulfilled, the entire slight activation of actuators 106$vl$ is extended by time deltat every time steps 817, 818, and 819 are performed. The same holds true for steps 808, 809, and 810, as well as 807.

Figure 9:
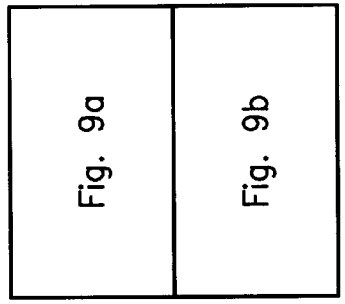
FIG. 9 shows a flow diagram describing a functional method of the control unit for the actuators of the brake insert.
Figure 9A:
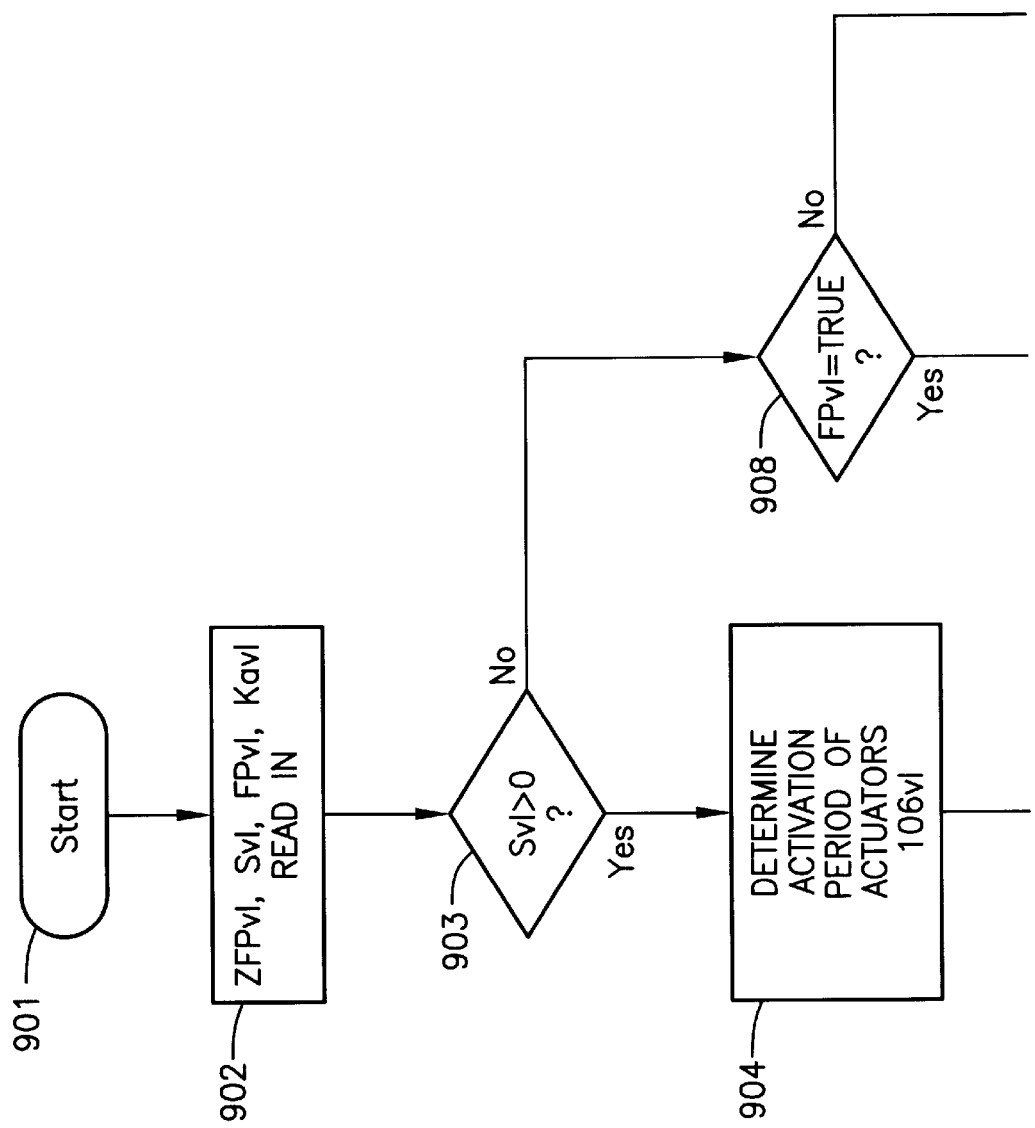
Figure 9B:
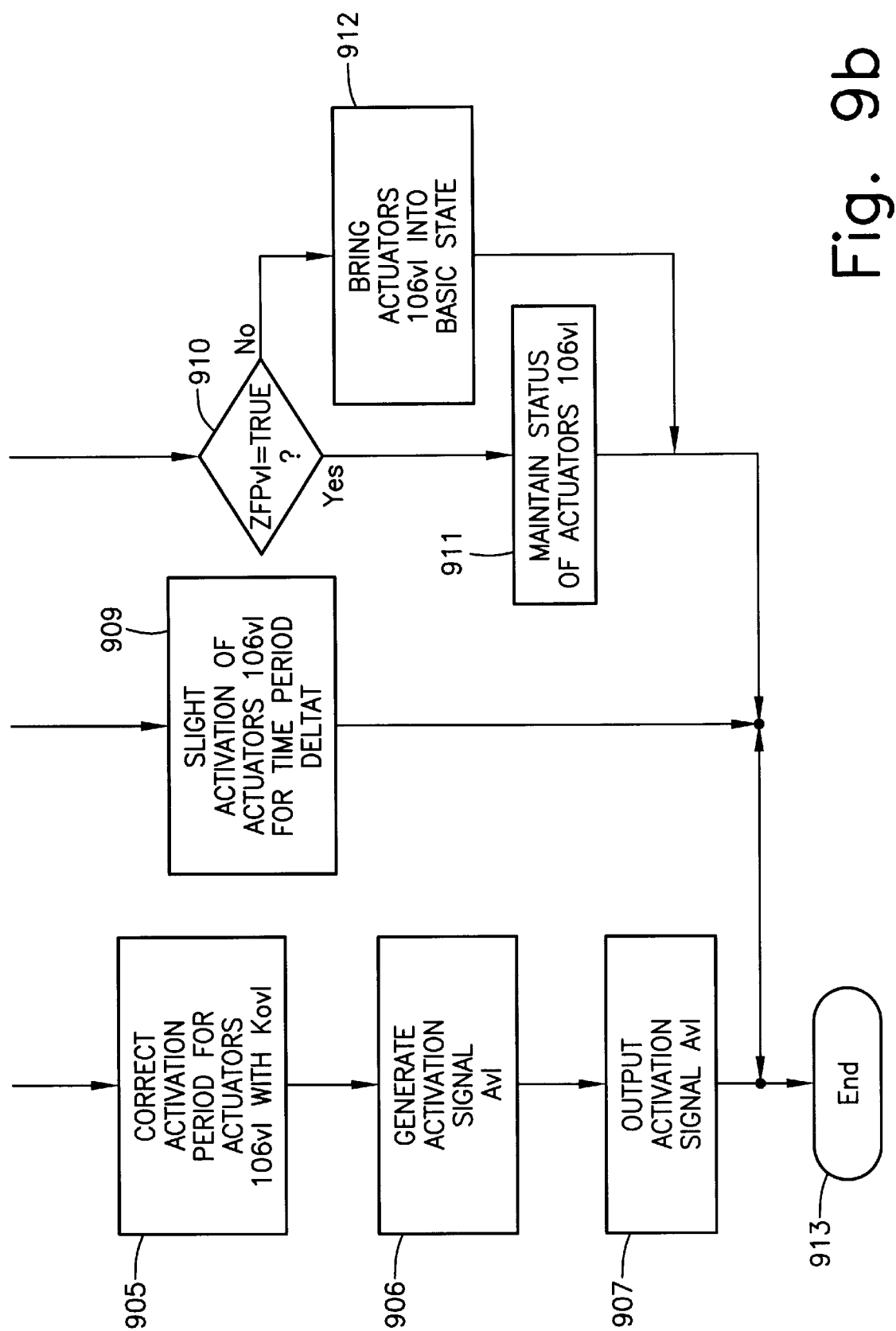

FIG. 9 describes the determination of control signals Aij for actuators 106$ij$ performed in block 206, using a description for the left front wheel. The selection of the left front wheel is not intended to represent a restriction. Driving conditions which result in activation of the actuators, by which the braking force is reduced at the wheel in question—this would be the case, for example, if signal Svl had a value less than zero—are not taken into consideration in the flow chart of FIG. 9.

The determination starts with step 901. In the following step 902, variables ZFPvl, Svl, FPvl, and Kovl are read in. In the next step, step 903, a determination is made whether the value of signal Svl is greater than zero. If the value of signal Svl is greater than zero, i.e. if regulator 201 performs a driver-independent brake intervention, then the activation period of actuators 106$vl$ is determined in step 904, proceeding from the value of signal Svl. The determination can take place, for example, by calculating the activation period on the basis of the value of signal Svl. Likewise, a determination using a characteristic line field is possible.

In the subsequent step 905, the activation period for actuators 106$vl$ which has been determined is corrected with correction factor Kovl. Correction of the activation period can take place, for example, by means of multiplication of the activation period determined in step 904 by correction factor Kovl.

Subsequent to this, in step 906, control signal Avl is generated from the corrected activation period. This is output in step 907. Then the process ends with step 913.

If it is found, in step 903, that the value of signal Svl is less than zero, step 908 is performed next. In step 908, it is determined whether signal FPvl possesses the value TRUE. If this is the case, step 909 is performed. In step 909, actuators 106$vl$ are slightly activated for time period deltat. After this slight activation of actuators 106$vl$, processing ends with step 913.

If it is found, as the result of the inquiry in step 908, that signal FPvl has not taken on the value TRUE, processing continues with step 910. In step 910, it is determined whether signal ZFPvl has taken on the value TRUE. If the signal has taken on this value, the previously set state of actuators 106$vl$ is maintained in step 911. If, on the other hand, it is found in step 910 that signal ZFPvl has not taken on the value TRUE, processing continues with step 912. In this step, actuators 106$vl$ are controlled in such a way that they are brought into their basic state, which normally results in a complete elimination (or reduction) of the braking force. Then processing ends with step 913.

Of course the activation periods for actuators 106$vl$, which are determined as part of a braking force elimination (or reduction) predetermined by regulator 201, are also corrected accordingly with correction factor Kovl.

It should be pointed out that the process, which takes place in a control device, is structured in such a way that all partial procedures, for example the one described in the flow chart of FIGS. 8$a$ and 8$b$, and the one described in the flow chart of FIG. 9, are processed in parallel. This means that a change in a signal value which takes place in the flow chart of FIGS. 8$a$ and 8$b$ is taken into consideration during the next calculation cycle, in accordance with the flow chart described in FIG. 9. Furthermore, it should also be noted that in steps 911 and 912, a corresponding determination of the value of signal Avl as well as output of this signal takes place.

It should be pointed out that the idea according to the invention can be used in any brake system. For example, these can be hydraulic or electrohydraulic, pneumatic or electropneumatic, as well as electromechanical brake systems. All these brake systems have the common feature that normally the brake effect is achieved using friction brakes, for example disk brakes and/or drum brakes. In the case of a disk brake, the braking force is implemented by pressing the brake shoes against the brake disk. In the case of a drum brake, the brake shoes press against the brake drum.

Figure 10:
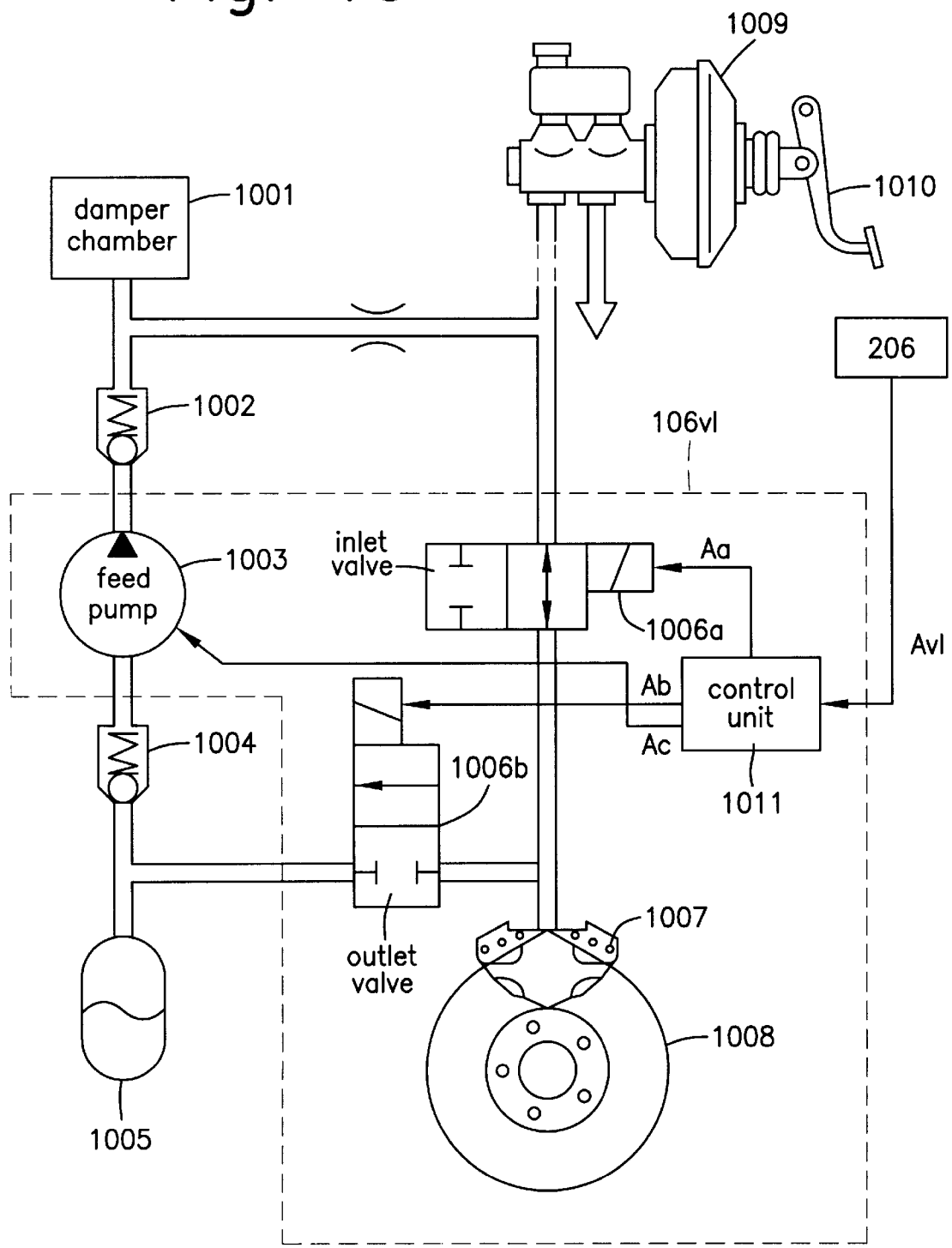
FIG. 10 shows an exemplary arrangement of the actuators or segments of a hydraulic brake system of a vehicle for, e.g., a left front wheel.

FIG. 10 shows a portion (indicated by the broken line showing the feed line of the master brake cylinder 1009) of part of a brake circuit of a hydraulic brake system. In particular, the part belonging to the left front wheel is being considered. Other than the combination of brake disk and brake shoes shown in FIG. 10, a combination consisting of a brake drum and a brake pad would also be possible. The fact that a hydraulic brake system is being considered here is not intended to restrict the present invention.

The part of the brake circuit shown in FIG. 10 consists essentially of the following components: damper chamber 1001, kick-back valves 1002 and 1004, feed pump 1003, storage chamber 1005, inlet valve 1006a, outlet valve 1006b, brake shoe unit 1007, brake disk 1008, master brake cylinder 1009, brake pedal 1010, and control unit 1011. In this connection, it is assumed that brake shoe unit 1007 additionally contains the wheel brake cylinder. Inlet valve 1006a and outlet valve 1006b are acted on by signals Aa and Ab generated by control unit 1011. Feed pump 1003 is controlled by signal Ac. All three signals Aa, Ab, and Ac are generated by block 1011, as a function of control signals Avl generated by block 206. Components 1003, 1006a, 1006b, 1007, 1008, and 1011 are combined as actuator 106vl.

In block 1011, signals Aa, Ab, and Ac are generated as a function of the value of control signal Avl. Inlet valve 1006a is controlled by signal Aa, outlet valve 1006b by signal Ab, and feed pump 1003 by signal Ac. If the value of control signal Avl is greater than zero, only signal Ac is generated, which has the result that feed pump 1003 is turned on. This causes brake fluid to be pumped into the wheel brake cylinder, resulting in a pressure increase in the wheel brake cylinder and in a braking force build-up due to the pairing of brake shoe unit 1007 and brake disk 1008. If the value of control signal Avl is less than zero, only signal Ab is generated in block 1011. Consequently, only outlet valve 1006b is activated. This allows brake fluid to flow out of the wheel brake cylinder, resulting in a reduction of the brake pressure in the wheel brake cylinder and thus of the braking force. If, on the other hand, control signal Avl is equal to zero, only signal Aa is generated in block 1011. Consequently, only inlet valve 1006a is activated. This causes the pressure in the wheel brake cylinder and therefore the braking force to be kept constant.

The valves 1006a and 1006b shown in FIG. 10 are in their basic position as shown therein. If they are activated, they assume the second possible state. In the basic state, the feed pump does not feed. It only feeds brake fluid when it is activated.

When the slight activation of the actuators, with a variable duration, takes place, the feed pump 1003 of the part of the hydraulic brake system shown in FIG. 10 is activated for a finite number of time periods deltat, afterwards it is back in the basic state, and inlet valve 1006a is activated, in order to maintain the brake pressure that has been achieved in the wheel brake cylinder, and therefore to maintain the braking force that has been achieved. During every time period delta, the brake shoes contained in brake shoe unit 1007 move closer to wheel brake disk 1008, because of the pressure build-up which is taking place. The slight activation of the actuators, with a variable duration, ends when signal Rvl takes on the value TRUE. This is the case when the brake shoes contained in brake shoe unit 1007 just rest against wheel brake disk 1008, without achieving any significant braking effect. In this state, the actuators are pre-stressed, but without achieving any significant braking effect.

The process and device according to the present invention can also be used for an electrohydraulic brake system. The same holds true for a pneumatic or an electropneumatic brake system. In the case of the electropneumatic as well as pneumatic brake system, a compressible medium is used for the brake pressure build-up, instead of the brake fluid. In these brake systems, it might be the case that different actuators than those described in this exemplary embodiment are activated. In the case of an electromechanical brake system, the braking force is generated directly by means of the motor operators coupled with the brake shoes and/or the brake pads, so that in the case of such a brake system, these motor operators are activated instead of valves 1006a and 1006b and instead of feed pump 1003.

Figure 11:
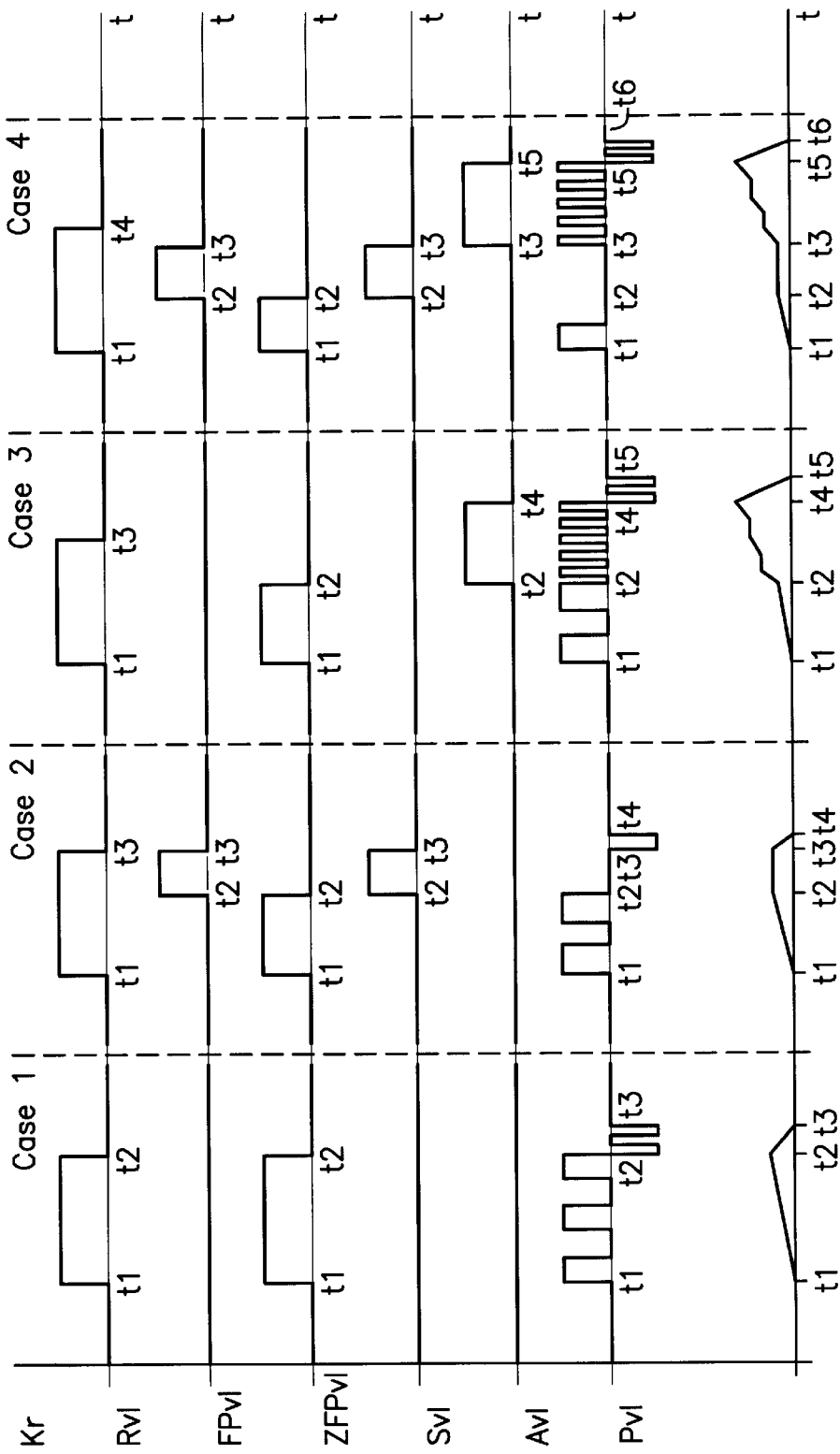
FIG. 11 shows time diagrams for various driving states of the vehicle.

FIG. 11 shows four different time diagrams of signals Kr, Rvl, Fpvl, ZFPvl, Svl, Avl, as well as brake cylinder pressure Pvl, which are necessary for implementation of the process and device of the present invention. The left front wheel is being considered.

The fact that the left front wheel is being considered is only exemplary and does not restrict the present invention. The idea according to the invention can be used for all wheels of a vehicle. Furthermore, the fact that brake cylinder pressure Pvl is being considered also does not restrict the present invention. Instead of brake cylinder pressure Pvl, the electricity needed for the electrical setting elements, to control the braking force, can be considered for an electromechanically activated brake, for example.

In Case 1 of FIG. 11, let it be assumed that a driving state of the vehicle is detected in block 202, at time t1, on the basis of which a driver-independent brake intervention is foreseeable. This driving state should last until the time t2. For this reason, signal Kr takes on the value TRUE between times t1 and t2. Since a driving state on the basis of which a driver-independent brake intervention is foreseeable is present between times t1 and t2, a slight brake pressure is to be supplied to the wheel brake cylinder in question before this foreseeable driver-independent brake intervention occurs. For this reason, block 204 outputs the value TRUE for signal FPvl starting from time t1. This generates signal Avl with a low frequency, starting at time t1. This results in a slight increase of the brake cylinder pressure at the wheel in question, starting from time t1, as the progression of Pvl shows (flat gradient of the wheel brake cylinder pressure). Furthermore, let it be assumed that for one thing, the wheel dynamics criterion is not fulfilled during the time period determined by times t1 and t2 (signal Rv has the value FALSE during the time period) and that for another thing, no driver-independent brake intervention has to be performed by regulator 201 (signal Svl has the value zero during this time period). Consequently, the brake pressure can constantly increase up to time t3. Since the driving state on the basis of which a driver-independent brake intervention is foreseeable is not supposed to be present any longer starting at time t2, (signals Kr and FPvl have the value FALSE starting from this time), the slight brake pressure in the wheel brake cylinder can be reduced again after this time. For this reason, block 206 outputs negative pulses with high frequency for signal Avl. The high-frequency pulses result in a steep gradient. At time t3, the reduction of the slight pressure has been completed, signal Avl assumes the value zero.

In Case 2 of FIG. 11, let it be assumed that a driving state of the vehicle on the basis of which a driver-independent brake intervention is foreseeable and is detected in block 202 at time t1. This driving state is supposed to last until time t3. For this reason, block 202 outputs the value TRUE for signal Kr between these times. Furthermore, let it be assumed that starting from time t2, the wheel dynamics criterion is fulfilled for the left front wheel starting at time t2. Therefore signal Rvl, output by block 203, takes on the value TRUE starting from this time t2. Since signal Kr has the value TRUE starting from time t1, signal FPvl is also assigned the value TRUE from this point in time. This results in supplying a slight brake pressure to the wheel brake cylinder in question, before the foreseeable driver-independent brake intervention occurs, which is supplied as long as signal Rvl has the value FALSE, i.e. during the time period between times t1 and t2. During this time period, wheel brake cylinder pressure Pvl increases constantly, as described in Case 1. Since the left front wheel fulfills the wheel criterion at time t2, signal Rvl takes on the value TRUE starting from this point in time, and signal FPvl is assigned the value FALSE. At the same time, signal ZFPvl is assigned the value TRUE. Let it be assumed that after time t2, regulator 201 does not have to perform any driver-independent brake intervention (signal Svl maintains the value zero). Since the wheel dynamics criterion is fulfilled starting from time t2, the low brake pressure is not allowed to be built up further starting from this time, it is kept constant as long as the driving state in which a driver-independent brake intervention is foreseeable lasts, i.e. until time t3. For this reason, signal ZFPvl output by block 204 has the value TRUE between times t2 and t3. During this time period, block 206 outputs the value zero for signal Avl. Consequently, the value of the wheel brake cylinder pressure is constant during times t2 and t3. Since the driving state in which a driver-independent brake intervention is foreseeable no longer exists starting from time t3, the slight brake pressure is reduced again starting from time t3. This occurs analogous to the method of procedure described for Case 1. Starting from time t4, the brake pressure in the wheel brake cylinder has been eliminated or reduced.

In Case 3 of FIG. 11, let it be assumed that a driving state on the basis of which a driver-independent brake intervention is foreseeable is detected in block 202 at time t1. Consequently, block 202 outputs the value TRUE for signal Kr. At the same time, block 204 outputs the value TRUE for signal FPvl starting from time t1. This, analogous to Case 2, results in a constant build-up of a slight brake pressure, starting at time t1. In the present case, let it furthermore be assumed that on the basis of the driving state of the vehicle, regulator 201 must perform a driver-independent brake intervention starting from time t2. For this reason, the regulator outputs a value greater than zero for signal Svl starting from time t2. Starting from this point in time, build-up of the slight brake pressure is no longer necessary. Therefore block 204 outputs the value FALSE for signal FPvl. Starting from time t2, the wheel brake cylinder pressure is to be built up more strongly. Consequently, block 206 generates signal Avl with higher frequency, starting at time t3. This results in a stronger increase in the brake pressure in the wheel brake cylinder. Starting from time t4, regulator 201 detects that the driver-independent brake intervention is no longer necessary. For this reason, it outputs the value zero for signal Svl. Consequently, starting from time t4, the brake pressure in the wheel brake cylinder in question must be reduced, starting from time t4. The reduction of the brake pressure takes place as already described in the previous cases. In the time diagram of Case 3, it is assumed that starting from time t2, output of signal Rvl is deactivated, consequently signal Rvl has the value FALSE during the entire process. In addition, since signal Rvl is deactivated, the value FALSE is output for signal ZFPvl. The possibility of deactivating signal Rvl is not taken into consideration in FIGS. 8a and 8b. Furthermore, in the time diagram of Case 3, it is assumed that block 202 outputs the value FALSE for signal Kr starting from time t3, since signal Svl is active (value greater than zero). This has no influence on the progression of the pressure build-up, since signal Svl has a value greater than zero up to time t4.

In Case 4 of FIG. 11, let it be assumed that a vehicle state on the basis of which a driver-independent brake intervention is foreseeable is detected in block 202 at time t1. Consequently, block 202 outputs the value TRUE for signal Kr starting from time t2. At the same time, block 204 assigns the value TRUE to signal FPvl. Furthermore, let it be assumed that starting from time t2, the wheel criterion is fulfilled for the left front wheel, and therefore signal Rvl takes on the value TRUE from this time. At the same time, block 204 outputs the value FALSE for signal FPvl and the value TRUE for signal ZFPvl starting at time t2. This has the result, as already described, of a constant build-up of a slight brake pressure between times t1 and t2. Starting from time t2, the brake pressure is kept constant at the value achieved. Let it furthermore be assumed that regulator 201 must perform a driver-independent brake intervention between times t3 and t5. Therefore it outputs a value greater than zero for signal Svl between these points in time. This has the result, analogous to Case 3, that an increased pressure build-up occurs in the wheel brake cylinder in question, starting at time t3. At the same time, at time t3, signals Rvl and ZFPvl are each assigned the value FALSE. Signal Kr is set to the value FALSE by block 202, at time t4. Starting at time t5, no driver-independent brake intervention is required any longer, consequently block 201 assigns the value FALSE to signal Svl. From this time on, the brake pressure is reduced again in the wheel brake cylinder in question. This process has been completed by time t6.

Figure 12:
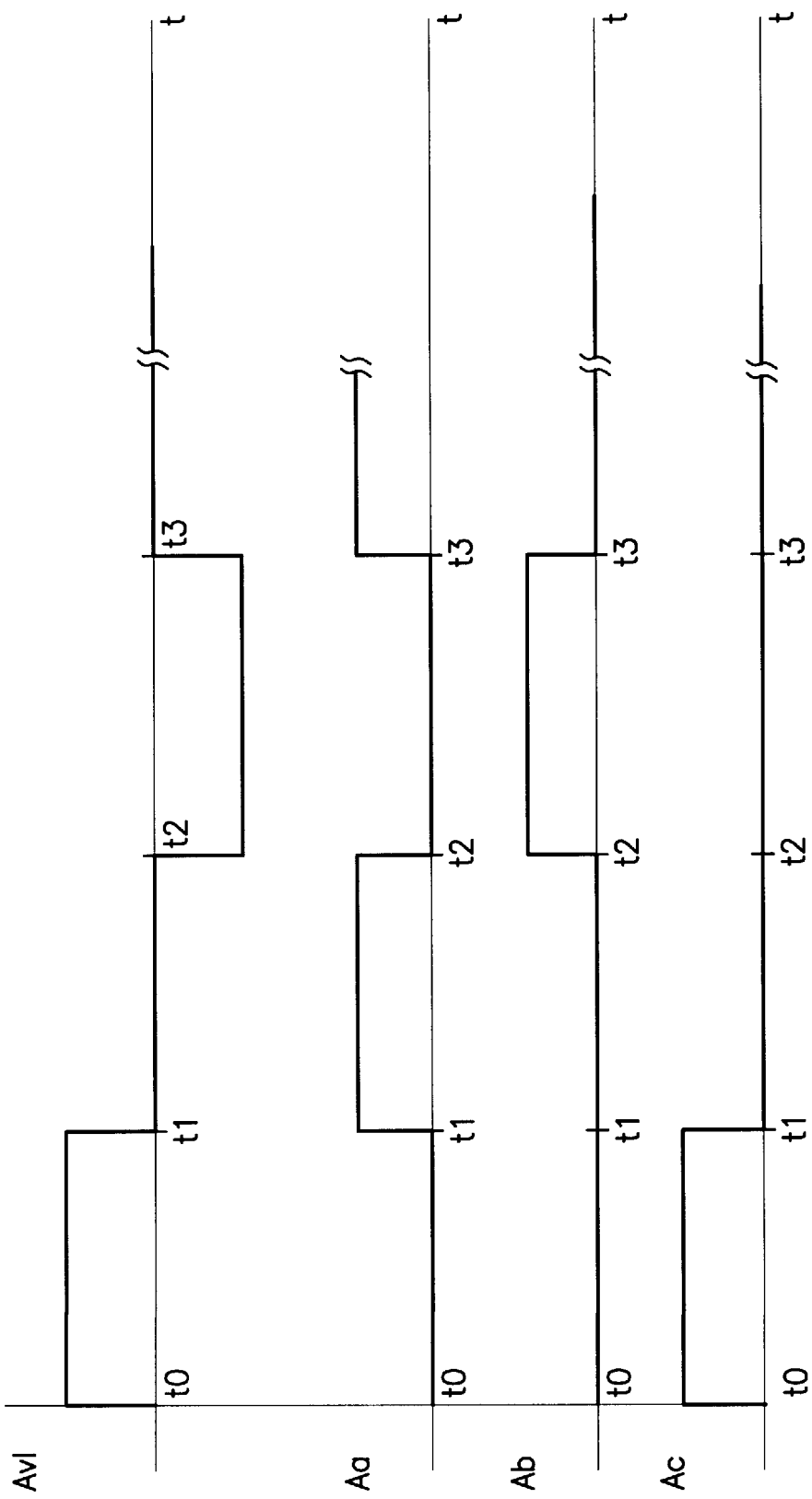
FIG. 12 shows a graphic relationship between signals Avl, Aa, Ab and Ac.

FIG. 12 shows the relationship between signals Avl, Aa, Ab, and Ac, proceeding from an arbitrary progression of signal Avl. During the time between t0 and t1, signal Avl assumes a value greater than zero. Consequently, only signal Ac is generated during this time period. During the time described by times t1 and t2, signal Avl assumes the value zero. During this time period, only signal Aa is generated. Between times t2 and t3, signal Avl assumes a value less than zero. Consequently, between these times only signal Ab is generated. Starting from that time, the case which existed between times t1 and t2 exists again.

What is claimed is:

1. A device for controlling a braking force of at least one wheel of a vehicle, comprising:
   a first arrangement determining a criterion, the criterion at least one of corresponding to a motion of the vehicle and influencing the motion of the vehicle;
   a second arrangement determining a wheel variable corresponding to wheel dynamics of a respective wheel of the at least one wheel;
   a third arrangement determining, as a function of the criterion, whether a driver-independent brake intervention at the respective wheel is foreseeable;
   a fourth arrangement activating actuators assigned to the respective wheel if the driver-independent brake intervention is foreseeable, the actuators being activated for a variable duration of time, the actuators being activated before the driver-independent brake intervention occurs; and a fifth arrangement determining the variable duration of time as a function of the wheel variable.

2. The device according to claim 1, wherein the first arrangement determines the criterion as a function of at least one of:

a deviation of an actual value of a driving dynamics variable from a predetermined reference value of the driving dynamics variable, and a temporal change in the deviation.

3. The device according to claim 2, wherein the driving dynamics variable includes at least one of a yaw velocity of the vehicle around a vertical axis of the vehicle and a cross acceleration affecting the vehicle.

4. The device according to claim 3, wherein the yaw velocity has a first reference value and the cross acceleration has a second reference value, at least one of the first reference value and the second reference value being determined as a function of at least one of a predetermined steering angle and a predetermined longitudinal vehicle velocity.

5. The device according to claim 1, wherein the wheel variable is determined as a function of at least one of a wheel acceleration and a wheel slip.

6. The device according to claim 5, wherein at least one of the wheel acceleration and the wheel slip is determined as a function of a wheel rotation speed of the respective wheel.

7. The device according to claim 1, wherein the foreseeable driver-independent brake intervention at the respective wheel occurs if at least one of the following conditions occur:

a deviation of an actual value of a driving dynamics variable from a predetermined reference value of the driving dynamics variable is greater than a first threshold value, and a temporal change in the deviation is greater than a second threshold value.

8. The device according to claim 1, wherein the actuators assigned to the respective wheel are deactivated when the wheel variable reaches a predetermined threshold value, the actuators being activated for a variable duration of time.

9. The device according to claim 8, wherein the predetermined threshold value is preselected so that when the actuators assigned to the respective wheel are deactivated, the actuators are pre-stressed without providing a significant braking effect.

10. The device according to claim 1, wherein the actuators assigned to the respective wheel are situated in components of at least one of a hydraulic brake system and an electrohydraulic brake system applying a braking force to the respective wheel, and wherein the actuators are activated for a variable duration of time to provide a brake fluid to a wheel brake cylinder cooperating with the respective wheel for increasing a brake pressure, the brake pressure being increased to slightly contact at least one of brake shoes and brake pads with the respective wheel without achieving a significant braking effect.

11. The device according to claim 1, wherein the actuators are activated for a variable duration of time to provide a brake medium to a wheel brake cylinder cooperating with the respective wheel for increasing a brake pressure, the brake pressure being increased to slightly contact at least one of brake shoes and brake pads with the respective wheel without achieving a significant braking effect.

12. The device according to claim 1, wherein the actuators assigned to the respective wheel are situated in components of an electromechanical brake system for applying a braking force to the respective wheel, and wherein at least one of brake shoes and brake pads are moved by activating of the actuators for a variable duration of time, the braking force being increased to slightly contact at least one of the brake shoes and the brake pads with the respective wheel without achieving a significant braking effect.

13. The device according to claim 1, wherein a plurality of brakes are in the same state before the driver-independent brake intervention occurs.

14. The device according to claim 1, wherein the actuators are slightly activated before an occurrence of the driver-independent brake intervention.

15. A process for controlling a braking force of at least one wheel of a vehicle, comprising the steps of:

determining a criterion, the criterion at least one of corresponding to a motion of the vehicle and influencing the motion of the vehicle;

determining a wheel variable corresponding to wheel dynamics of a respective wheel of the at least one wheel;

determining whether a driver-independent brake intervention at the respective wheel is foreseeable as a function of the criterion;

determining a variable duration of time for activating actuators corresponding to the respective wheel as a function of the wheel variable; and activating the actuators for the variable duration of time if the driver-independent brake intervention is foreseeable, the actuators being activated before a start of the driver-independent brake intervention.

16. The process according to claim 15, wherein a plurality of brakes are in the same state before the driver-independent brake intervention occurs.

17. The process according to claim 15, wherein the actuators are slightly activated before the start of the driver-independent brake intervention.

* * * * *